(12) United States Patent
Perelli

(10) Patent No.: US 11,561,575 B2
(45) Date of Patent: Jan. 24, 2023

(54) DISPLAY DEVICE

(71) Applicant: Lenovo (Singapore) Pte. Ltd., Singapore (SG)

(72) Inventor: Thomas Perelli, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 28 days.

(21) Appl. No.: 17/137,870

(22) Filed: Dec. 30, 2020

(65) Prior Publication Data
US 2022/0206527 A1    Jun. 30, 2022

(51) Int. Cl.
*G06F 1/16*    (2006.01)
(52) U.S. Cl.
CPC .......... *G06F 1/1616* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,256,193 B1 * | 7/2001 | Janik | ..................... | G06F 1/1669 248/922 |
| 6,353,529 B1 * | 3/2002 | Cies | ..................... | G06F 1/1656 361/679.05 |
| 6,807,055 B2 * | 10/2004 | Usui | ..................... | G06F 1/1632 D14/434 |
| 6,975,507 B2 * | 12/2005 | Wang | ..................... | G06F 1/166 292/358 |
| 7,652,873 B2 * | 1/2010 | Lee | ..................... | G06F 1/1681 248/920 |
| 7,804,679 B2 * | 9/2010 | Pischl | .................. | G06F 1/1601 361/679.04 |
| 9,256,259 B2 * | 2/2016 | Lin | ..................... | G06F 1/1613 |
| 9,261,901 B2 * | 2/2016 | Truong | .................. | H05K 7/16 |
| 10,405,658 B2 * | 9/2019 | McCrate | ................ | F16M 13/00 |
| 11,234,510 B2 * | 2/2022 | Perelli | ..................... | A47B 23/04 |
| 11,237,643 B2 * | 2/2022 | Kulkarni | ................. | G06F 1/166 |
| 11,243,576 B2 * | 2/2022 | Gerardi | ................. | G06F 1/1632 |
| 2020/0301480 A1 * | 9/2020 | Miller | ..................... | E05D 11/00 |
| 2021/0207760 A1 * | 7/2021 | Perelli | ..................... | G06F 1/1632 |
| 2021/0278881 A1 * | 9/2021 | Atom | ..................... | G06F 1/1637 |
| 2021/0333839 A1 * | 10/2021 | Yao | ..................... | G06F 1/1681 |
| 2021/0333840 A1 * | 10/2021 | Channaiah | .......... | E05D 11/1078 |
| 2021/0405716 A1 * | 12/2021 | Tucker | ..................... | G06F 1/166 |

* cited by examiner

*Primary Examiner* — Lisa Lea-Edmonds
(74) *Attorney, Agent, or Firm* — Brian J. Pangrle

(57) ABSTRACT

A display device can include a display panel hinged to a support panel that includes a first portion hinged to a second portion, where the display panel includes a display surface and a back surface, where the support panel is foldable over the display surface and foldable over the back surface, and where the first portion is hingedly adjustable with respect to the second portion for angled support of the display panel.

20 Claims, 17 Drawing Sheets

DISPLAY DEVICE

TECHNICAL FIELD

Subject matter disclosed herein generally relates to technology for computing devices.

BACKGROUND

Various types of computing devices have one or more housings. For example, a tablet computing device (e.g., a tablet) can have a single housing with a display and a notebook computing device (e.g., a notebook) can have two housings where one of the housings is a display housing and the other one of the housings is a keyboard housing where the two housings are coupled by a hinge assembly.

SUMMARY

A display device can include a display panel hinged to a support panel that includes a first portion hinged to a second portion, where the display panel includes a display surface and a back surface, where the support panel is foldable over the display surface and foldable over the back surface, and where the first portion is hingedly adjustable with respect to the second portion for angled support of the display panel. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
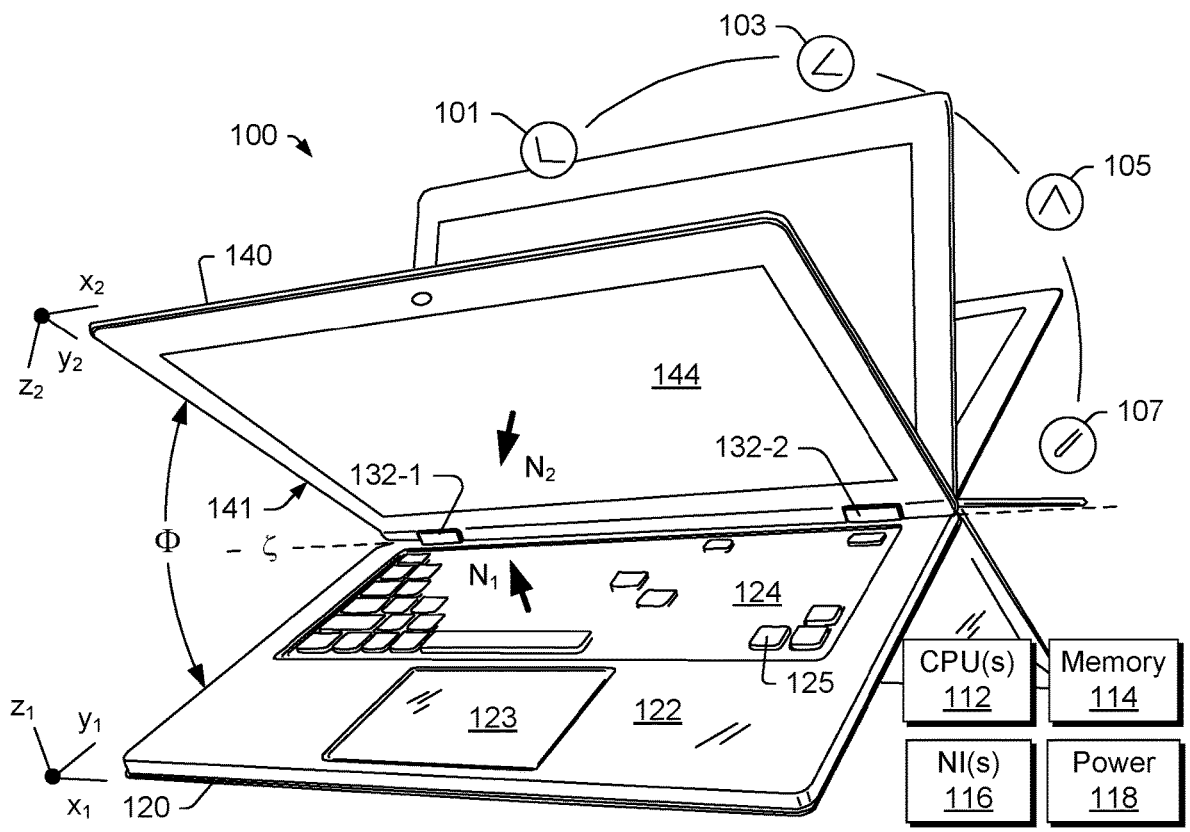
FIG. 1 is a series of diagrams of an example of a device.
Figure 1:
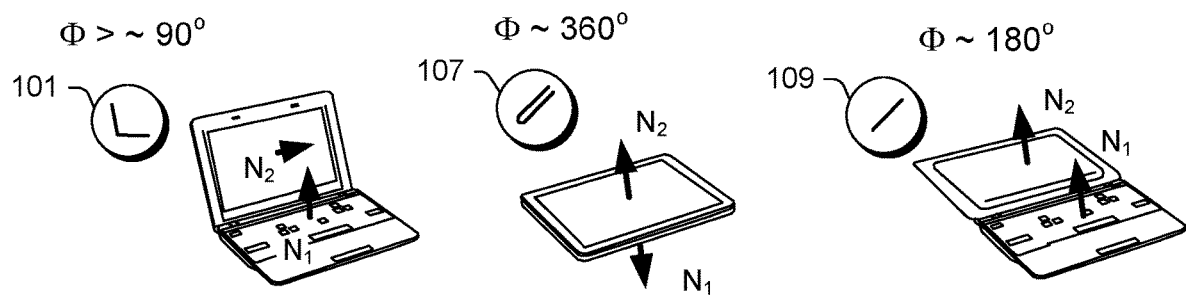

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 141 with a display surface 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 141 is defined in a second Cartesian coordinate system as having a width along an x-axis ($x_2$), a depth along a y-axis ($y_2$) and a height or thickness along a z-axis ($z_2$) that extends in a direction outwardly away from the viewing surface 144 of the display 141. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 141 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 141 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 141 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 (e.g., normal to an $x_1,y_1$-plane) and a normal outward vector $N_2$ of the display 141 of the display housing 140 (e.g., normal to an $x_2,y_2$-plane) are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\theta$ is about 180 degrees such that a normal outward vector $N_1$ of the keyboard 124 of the keyboard housing 120 and a normal outward vector $N_2$ of the display 141 of the display housing 140 are oriented in approximately the same pointing directions.

Various computing systems such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2A:
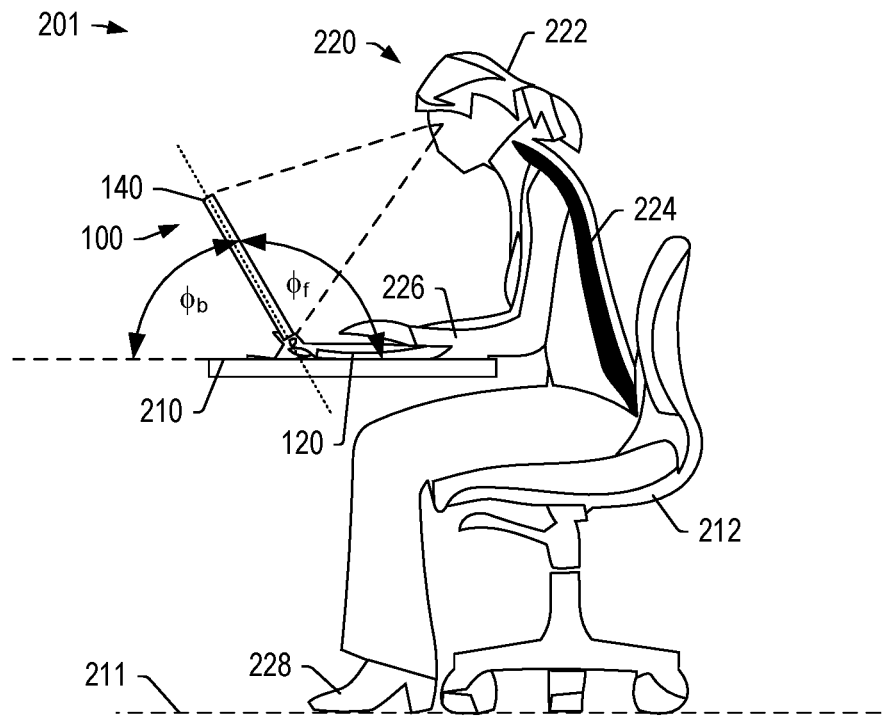
FIG. 2A and FIG. 2B are a series of diagrams of user scenarios for the device of FIG. 1.
Figure 2B:
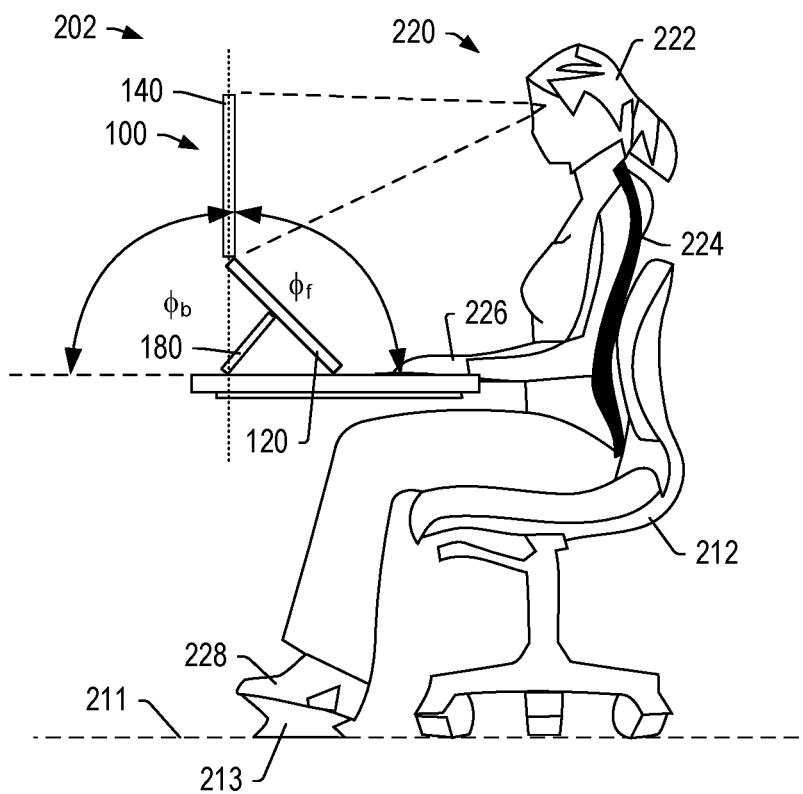

FIG. 2A and FIG. 2B show example scenarios 201 and 202 for a user 220 using the device 100 where the scenario 201 corresponds to poor ergonomics and the scenario 202 corresponds to improved ergonomics. As shown, the device 100 is supported on a surface 210 that is parallel to a floor surface 211 where a chair 212 is positioned on the floor surface 211. As shown, the user 220 includes a head 222, a spine 224, arms with hands 226 and feet 228. The user 220 is seated on the chair 212 with hands 226 at least in part supported on the surface 210.

In the scenario 201, the device 100 is supported by the housing 120 on the surface 210 and open such that the display housing 140 forms angles with the surface 210, which include a back side angle $\phi_b$ and a front side angle $\phi_f$ where the front side angle $\phi_f$ is greater than 90 degrees (e.g., approximately 91 degrees to 135 degrees) and, hence, the back side angle is less than 90 degrees (e.g., approximately 45 degrees to 89 degrees). As shown, the user 220 must curve her spine 224 to angle her head 222 to view the display of the display housing 140.

In the scenario 202, the display housing 140 is elevated through use of a stand 180 such that the back side angle $\phi_b$ and the front side angle $\phi_f$ are approximately equal (e.g., equal to approximately 90 degrees+/−10 degrees). With the display housing 140 elevate to a greater height with respect to the surface 210 and at an approximately 90 degree angle, the user 220 can sit up more straight in the chair 212 such that her spine 224 can be in a more natural and stacked position with the head 222 approximately directly above the spine 224. In such an example, the user 220 may utilize a foot rest 213 to rest her feet 228, which may improve support of the user's body on the chair 212.

As shown in FIG. 2A, spine alignment problems may give rise to fatigue when using a device such as a notebook. As explained, and shown in FIG. 2B, a stand may be available as an accessory to raise a display higher for improved posture such that the top leading edge of the display's active area is at eye level (e.g., for the anthropometric 50 percentile of adult-sized users).

However, having a notebook's display raised by an accessory stand can make the notebook's keyboard unusable because of the steep angle. For example, in the scenario 202, the user 220 may have to use an accessory keyboard (e.g., a keyboard external to the device 100).

When a user is in a workplace or other dedicated workstation, the user may have an accessory keyboard present along with the stand such that the user need not carry and transport the accessory keyboard from place to place, which may detract from the portability of the device.

Where a user's workstation has an accessory display, a user may position a notebook on a stand such that a display of the notebook is substantially even with a level of the accessory display. With multiple displays, a user may be more efficient and experience less fatigue. In some instances, a user may rely on workstation displays alone without use of a notebook's display but with use of the compute and network resources of the notebook (e.g., by plugging in one or more displays to the notebook, directly and/or through a docking station). Increased display area can allow a user to more effectively multitask, coordinate use of applications, etc.

For users that are often mobile and/or not working at dedicated workstations, the user may have to carry and transport an extra display. In some instances, the user may have to carry and transport an extra display, a stand and an accessory keyboard. Such extras can be detrimental to the user's mobility, and taxing as to what the user must remember to throw in to a travel bag, etc. For example, consider detriments to an individual that operates under a work practice referred to as hoteling (short-term provision of office space or workstations for employees or others). In various instances, a user may bring her notebook, an ergonomic stand and a tablet or second notebook in a backpack or a bag.

Figure 3:
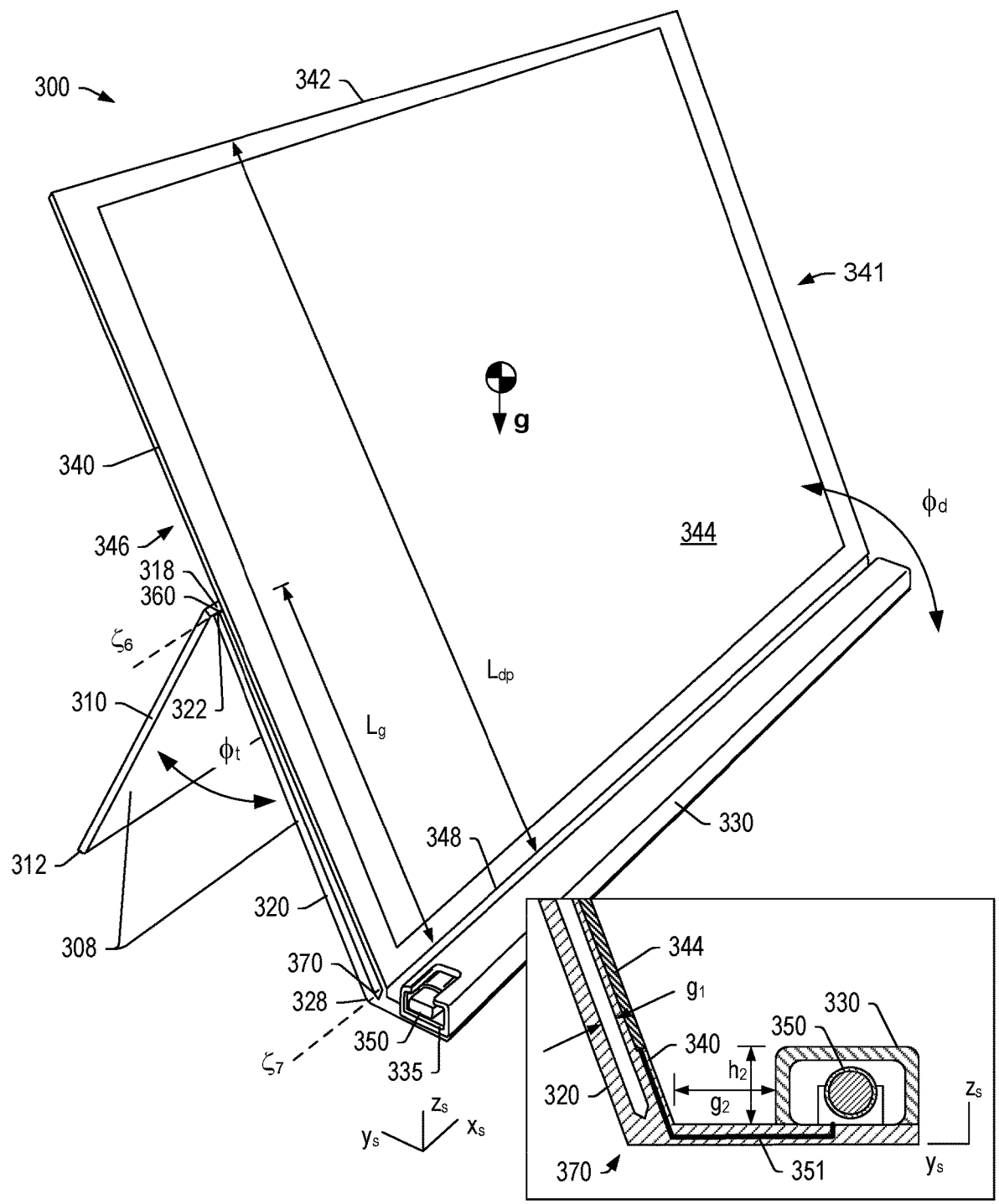
FIG. 3 is a perspective view of an example of a display device.

FIG. 3 shows an example of a display device 300 that includes a display panel 340 hinged to a support panel 308 that includes a first portion 310 hinged to a second portion 320, where the display panel 340 includes a display 341 with a display surface 344 and that includes an opposing back surface 346, where the support panel 308 is foldable over the display surface 344 and foldable over the back surface 346, and where the first portion 310 is hingedly adjustable with respect to the second portion 320 for angled support of the display panel 340.

In the example of FIG. 3, various features may be described with respect to one or more coordinate systems. For example, consider a Cartesian coordinate system $x_s$, $y_s$ and $z_s$ where a support surface can be in an $x_s,y_s$-plane where the display panel 340 may be positioned, for example, in an $x_s,z_s$-plane and then rotated back to rest on a portion of the support panel 308 or, for example, if a portion of a computing device is disposed between the support panel 308 and the display panel 340, the display panel 340 may be rotated back to rest on the portion of the computing device.

In the example of FIG. 3, the display device 300 includes a first hinge 360 and a second hinge 370 where the first portion 310 and the second portion 320 are coupled via the first hinge 360 (see, e.g., a hinge axis $\zeta_6$) and where the display panel 340 and the second portion 320 are coupled via the second hinge 370 (see, e.g., a hinge axis $\zeta_7$). As shown, the first portion 310 includes opposing edges 312 and 318, the second portion 320 includes opposing edges 322 and 328 and the display panel 340 includes opposing edges 342 and 348 where the edges 318, 322, 328 and 348 can be referred to as hinge edges where the edge 322 is a first hinge edge and the edge 328 is a second hinge edge of the second portion 320. As shown, the first hinge 360 can join edges 318 and 322 and the second hinge 370 can join edges 328 and 348.

As shown, a gap $g_1$ can be formed between the display panel 340 and the support panel 308 where the gap $g_1$ can have a length $L_g$, which is shown as being less than a length $L_{dp}$ as defined by the edges 342 and 348 of the display panel 340. Further, the display device 300 can include a tubular member 330 that can house a display connector 350, for example, in a connector bay 335 defined at least in part by the tubular member 330. As shown, the tubular member 330 can be defined using the Cartesian coordinate system $x_s$, $y_s$ and $z_s$ and can have a cross-sectional shape (e.g., in a $y_s,z_s$-plane with a height $h_2$) that may be substantially rectangular; noting that it may be circular, oval, etc. (e.g., with a shape to accommodate the display connector 350). In the example of FIG. 3, a gap $g_2$ can be formed between the tubular member 330 and the display panel 340. In such an example, the gap can be of a size (e.g., or of an adjustable size) such that the display panel 340 can fold over the tubular member 330. For example, the tubular member 330 can be a spacer that spaces the display panel 340 and the support panel 308 when in a closed orientation (e.g., with the display panel 340 substantially parallel to the support panel 308 where the display surface 344 is facing the support panel 308 (e.g., to protect the display surface 344, etc.). Such a closed orientation may be a storage orientation where, for example, a computing device may be disposed at least in part between the display panel 340 and the support panel 308 (e.g., consider a computing device such as a notebook, a tablet, etc.). In such an example, the display device 300 can be a computing device cover, which may help to protect the computing device while carrying it, transporting it, storing it, etc. In such an example, the second portion 320 may include a resilient portion that can allow it to be folded under the tubular member 330. For example, material at the hinge 370 and/or along the second portion 320 near the hinge 370 may be resilient such that the display panel 340 can fold over the tubular member 330 and the support panel 308 can fold under the tubular member 330 where the tubular member 330 spaces the display panel 340 and the second portion 320 of the support panel 308. As an example, a seam may exist that extends from the hinge 370 toward the tubular member 330 where the seam allows for increasing the gap $g_1$ and/or folding of the display panel 340 and the support panel 308.

In the orientation shown in FIG. 3, the gap $g_1$ can be sufficient (e.g., as is or adjustably) to receive at least a portion of a housing of a computing device. For example, consider inserting the keyboard housing 120 of the device 100 between the display panel 340 and the second portion 320 of the support panel 308. In such an example, a lower edge of the display housing 140 may be substantially even with the edge 342 of the display panel 340 such that the display surface 144 of the display 141 of the display housing 140 and the display surface 344 of the display 341 of the display panel 340 are both visible to a user.

As an example, the display device 300 may be made of one or more elastomeric materials and/or include an elastically expandable mechanism. For example, the gap $g_1$ may be an adjustable gap where it can expand for receipt of a housing between the display panel 340 and the support panel 308. In an expanded state, the gap $g_2$ may diminish in size (e.g., the display panel 340 may become closer to the tubular member 330). As mentioned, a seam may be provided that can allow for adjustments where such a seam may be additional or alternative to utilization of one or more elastic mechanisms.

As an example, the hinge 360 and/or the hinge 370 can be a living hinge. As an example, a living hinge can be a relatively thin flexible hinge (e.g., flexure bearing, etc.). As an example, a living hinge may be made from a common material that is common to two panels. As an example, a living hinge may be thinned or cut to allow relatively rigid pieces to bend along a line or lines of the hinge. A living hinge may be configured for movement with low friction for low wear. As an example, a material can be elastomeric and provide for elastic deformation where one side may compress (compressive elastic deformation) while an opposing side experiences tension (e.g., tensile elastic deformation). As an example, an elastomeric material may be a polymeric material, a natural material, etc. As an example, a hinge can include one or more ribs, which may run longitudinally, for example, to demarcate one or more regions that are foldable, etc. As an example, a polymer can include one or more of polyethylene, polypropylene and other polymeric resin(s), which may exhibit acceptable fatigue resistance during cycles of folding.

As an example, a hinge can include fabric and may be referred to as a fabric hinge. As an example, one or more conductive fabrics may be utilized for electrical coupling between circuitry and a display connector, which, as mentioned, may provide for transmission of at least data and optionally power.

As an example, a hinge can be a mechanical hinge. For example, consider a piano type hinge, which may be a continuous hinge. As an example, a hinge can be a barrel hinge that includes a barrel, a pin and leafs. As an example, a mechanical hinge may be adjustable as to friction (e.g., a friction hinge) such that an angle can be maintained for a given amount of force. For example, consider a force (e.g., torque) that is to be applied to the first portion 310 about the axis $\zeta_6$ to cause the first portion 310 to move. Such a force may be suitable for adjustment by hand while a lesser torque is a sufficient to maintain an angle between the first portion 310 and the second portion 320 in the orientation shown in the example of FIG. 3, with or without a notebook housing being received at least in part in the gap $g_1$.

As to calculation of torque, consider an example for a notebook where an angle of a display housing is 45 degrees, the mass of the display housing is 2 lb (e.g., 0.9 kg), the length of the display housing is 10 inches (e.g., 25.4 cm) and the distance to the center of gravity (CoG) is 5 inches (e.g., 12.7 cm), assuming evenly distributed mass. In such an example, the torque exerted by the display housing on a hinge that couples the display housing to a keyboard housing at a 45 degree angle is: torque=(2 lb)(5 in)(cos 45 deg)=7.07 lb· in (e.g., approximately 0.8 N·m). As an example, the hinge 360 of the display device 300 may demand a torque of greater than approximately 2 lb· in (e.g., approximately 0.22 N·m) to cause rotation of one of the portions 310 and 320 with respect to the other one of the portions 310 and 320.

As an example, the display surface 344 of the display panel 340 may be specified using a diagonal measurement. For example, consider a 10.1 inch (e.g., 25.6 cm), a 11.6 inch (e.g., 29.4 cm), a 12.5 inch (e.g., 31.7 cm), a 13.3 inch (e.g., 33.8 cm), a 14 inch (e.g., 35.6 cm), a 15.6 inch (e.g., 39.6 cm), a 17.3 inch (e.g., 43.9 cm), an 18.4 inch (e.g., 46.7 cm), etc., diagonal, which may provide for a desirable aspect ratio (e.g., 3:2, 16:10, 16:9, etc.). As an example, the display device 300 may accommodate one or more sizes of computing devices where, for example, a display size of a computing device (e.g., a laptop) may be the same or approximately the same diagonal size as the display surface 344 of the display panel 340 such that the display device 300 approximately doubles the available display area when utilized. Where a computing device has a display size less than that of the display panel 340, the display device 300 can provide greater than a 100 percent increase in display area.

In the example of FIG. 3, the hinge 370 can be an approximately 360 degree hinge such that the display surface 344 can be folded over the one or another side of the support panel 308. As an example, the hinge 360 may be limited to a lesser range of movement, which may be unidirectional from a plane defined by the support panel 308. As an example, the hinge 360 may have a range less than or equal to approximately 180 degrees.

In the example of FIG. 3, the display device 300 may be utilized as an auxiliary display (e.g., an accessory display, etc.). For example, the display connector 350 may be connected to a connector of a device (e.g., the device 100, etc.) such that at least video signals can be received for rendering of information (e.g., text, graphics, images, etc.) to the display 341 of the display panel 340. As shown, one or more conductors 351 can be operatively coupled to the display connector 350 for transmission of such signals. As an example, the display connector 350 may also provide for transmission of power. For example, consider a connector such as a USB-C connector that can carry video signals and power. In such an example, the display device 300 can be powered via another device (e.g., consider the device 100 of FIG. 1, etc.). As an example, the display device 300 may be utilized as a stand for another computing device or may be utilized separately while being connected to another computing device (e.g., directly and/or indirectly).

As to the support panel 308, as explained, the portion 310 can be adjustable with respect to the portion 320, for example, via the hinge 360. FIG. 3 shows an example of a center of gravity, g, where the display device 300 can exert a force (e.g., F=mg) onto a surface such as the surface 210 in FIG. 2A or FIG. 2B. As shown, the portion 310 can form an angle $\phi_t$ with respect to the portion 320, which may be referred to as a tent angle. As an example, a portion of the tubular member 330 may include a shear resistant surface (e.g., rubberized, etc.) such that risk of sliding is reduced on a support surface. For example, a surface of the tubular member 330 may be an anti-slip surface such that the display device 300 can maintain stability in a desired position, with or without receipt of a device between the display panel 340 and the second portion 320 of the support panel 308. As an example, the first portion 310 of the support panel 308 can include an anti-slip surface along at least a portion of the edge 312 for enhanced stability. As shown, the edge 312 can be at an end of the support panel 308 and parallel to the hinge edge 318 of the first portion 310 and the second portion 320 can include the opposing hinge edges 322 and 328 where the hinge edge 322 is paired with the hinge edge 318. As mentioned, the hinge 360 can be a friction hinge that has a torque rating sufficient to maintain stability in a desired position, with or without receipt of a device between the display panel 340 and the second portion 320 of the support panel 308 (e.g., at least in part in the gap $g_1$).

As shown in the example of FIG. 3, an angle of the second portion 320 with respect to a support surface can determine an approximate angle $\phi_d$ of the display surface 344 of the display panel 340; noting that the gap $g_1$ may diminish in size in a direction from the edge 328 to the edge 322. For example, at or near the edge 322, the back side 346 of the display panel 340 may be in contact with the second portion 320. In such an example, a space with a substantially triangular cross-section may be formed between the display panel 340 and the second portion 320 of the support panel 308. As an example, the angle $\phi_d$ may be adjustable where it can be adjustable within a range of approximately 90 degrees to approximately 135 degrees or more.

As an example, the display device 300 can be a stand and an auxiliary display for a computing device such as, for example, the device 100 of FIG. 1. As an example, the device 100 may be in the orientation 101 with the keyboard housing 120 received between the second portion 320 and the display panel 340 where the display 141 of the display housing 140 is exposed and viewable above the display panel 340. Other arrangements may be provided as well. For example, consider the orientation 105 where the display 141 is viewable to one side and the display 341 is viewable to another side with the keyboard housing 120 disposed between the second portion 320 and the display panel 340. As another example, consider the orientation 107 where the display housing 140 may overlay the display panel 340 with the keyboard housing 120 disposed between the second portion 320 and the display panel 340.

The display device 300 may be carried and transported by a user along with a device such as, for example, the device 100 of FIG. 1 (e.g., or a single housing tablet device, etc.) where a display of the display panel 340 can be utilized as a primary display or as an auxiliary display (e.g., a second display). Such an approach may be of lesser mass than a two notebook approach; noting that an accessory keyboard may be utilized such as, for example, a wired and/or wireless keyboard. As an example, the display device 300 can include wireless communication circuitry that can be suitable for pairing with wireless communication circuitry of a wireless keyboard. In such an example, the display connector 350 may provide for data such as keystroke data that can be received by a computing device that includes a connector that can mate with the display connector 350. In such an example, keystroke data can flow in one direction (e.g., from the display device 300 to the computing device) and video data can flow in an opposite direction (e.g., from the computing device to the display device 300). As an example, where the display device 300 includes wireless communication circuitry (e.g., one or more wireless interfaces), it may communicate with wireless communication circuitry of a computing device. In such an example, the display device 300 may be a bridge between an accessory and a computing device. For example, consider the display device 300 being an intermediate device that bridges an accessory keyboard to a computing device.

Figure 11A:
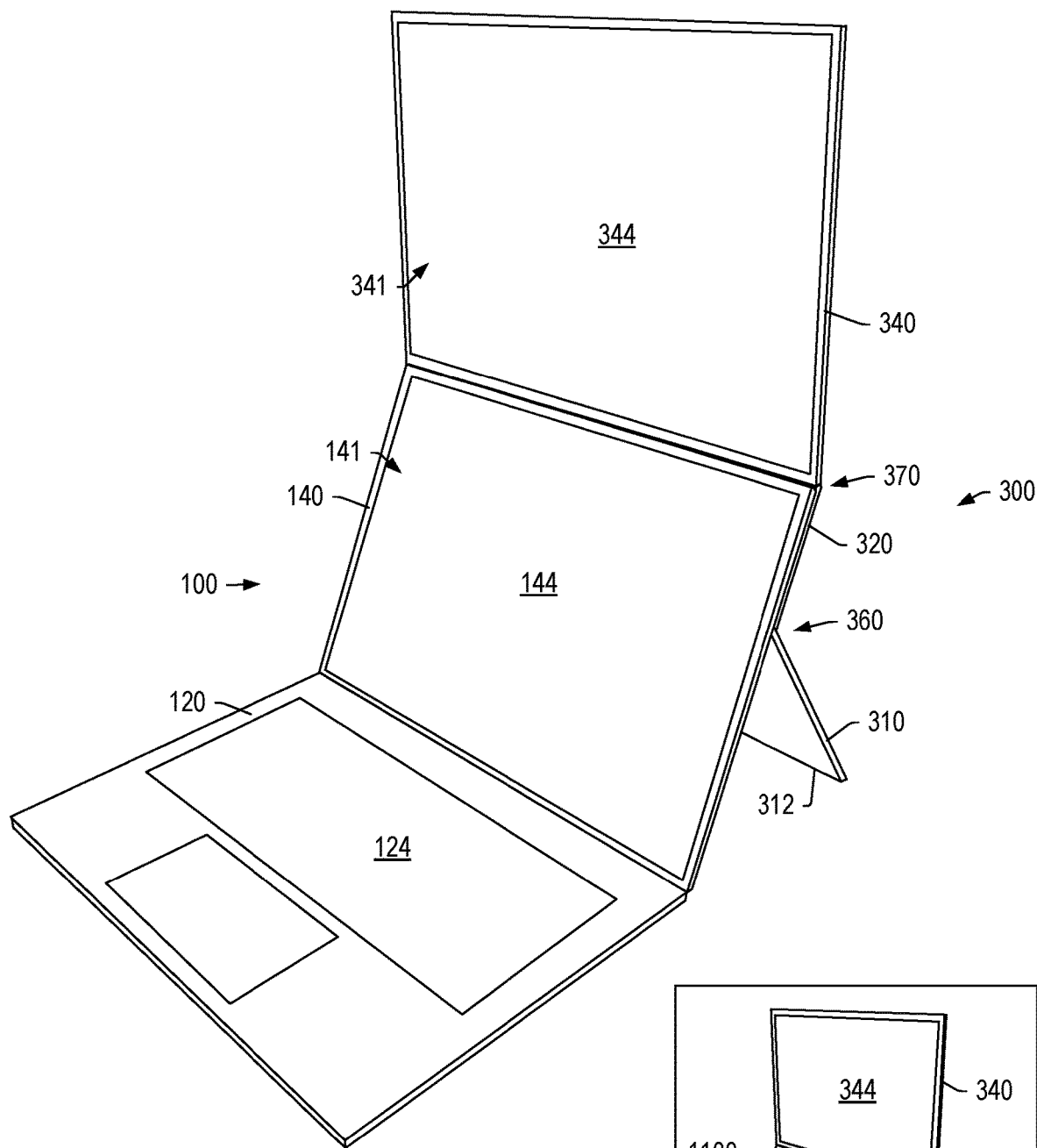
FIG. 11A and FIG. 11B are perspective views of an example of a display device with a notebook device and a tablet device, respectively.
Figure 11B:
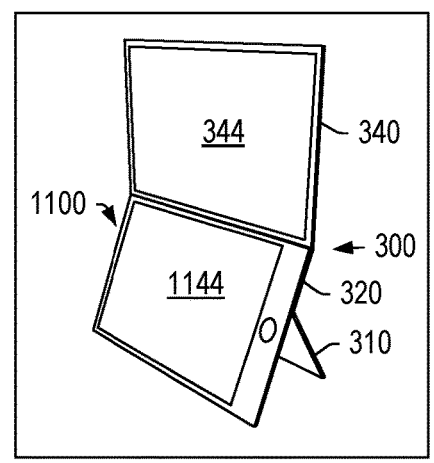
Figure 12:
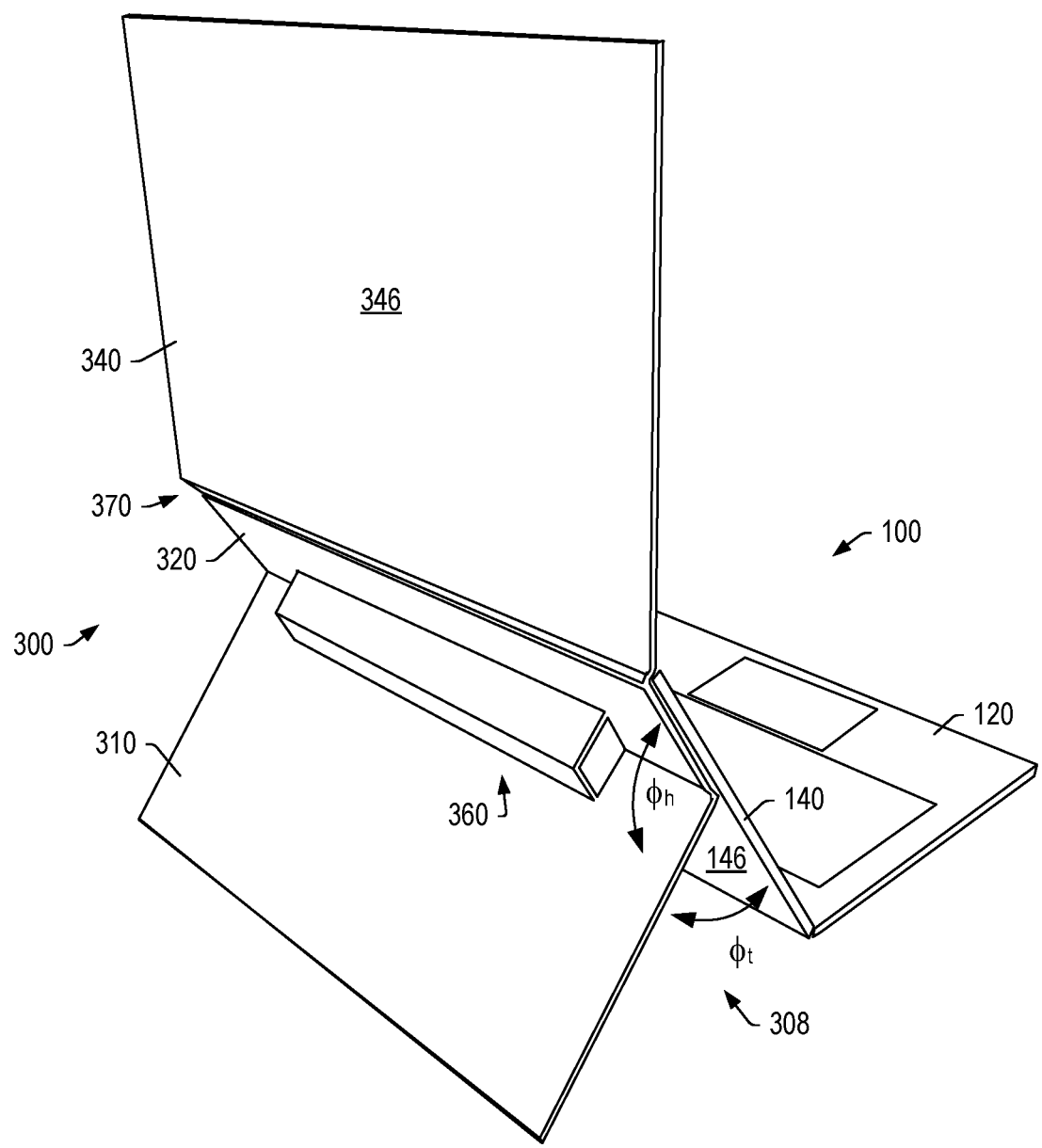
FIG. 12 is a back side perspective view of the assembly of FIG. 11A.
Figure 13A:
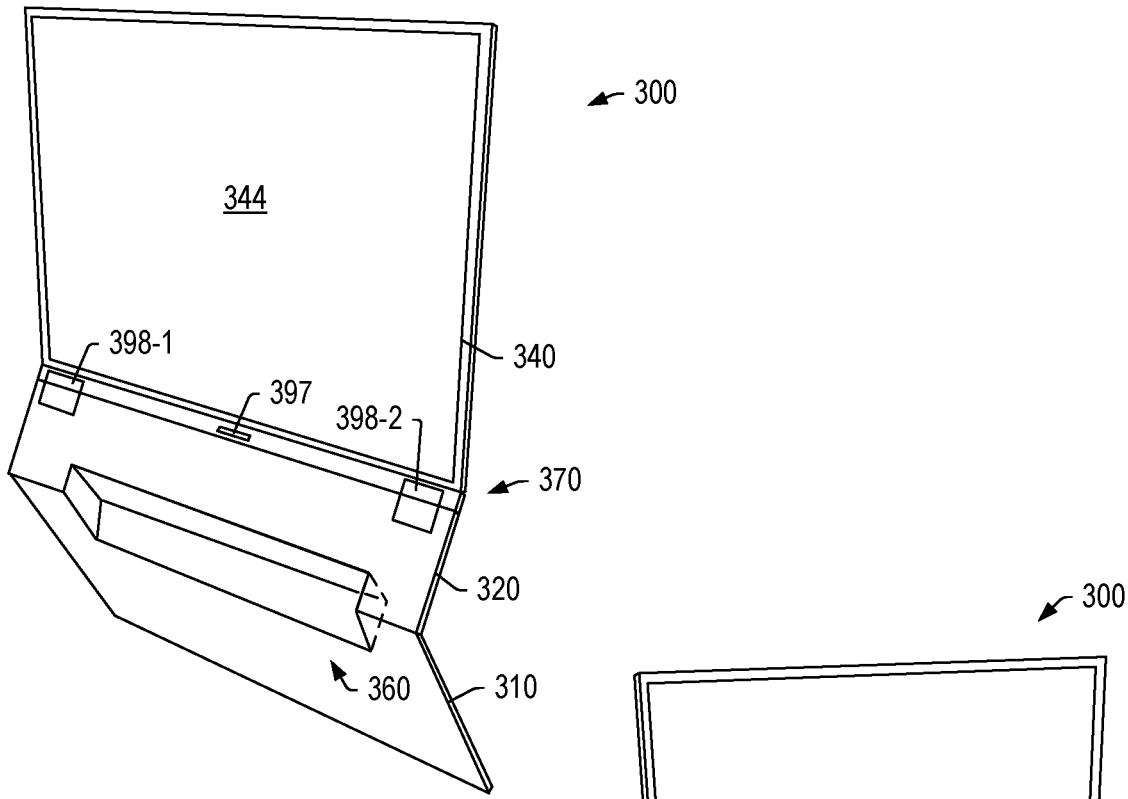
FIG. 13A and FIG. 13B are perspective views of an example of a display device.
Figure 13B:
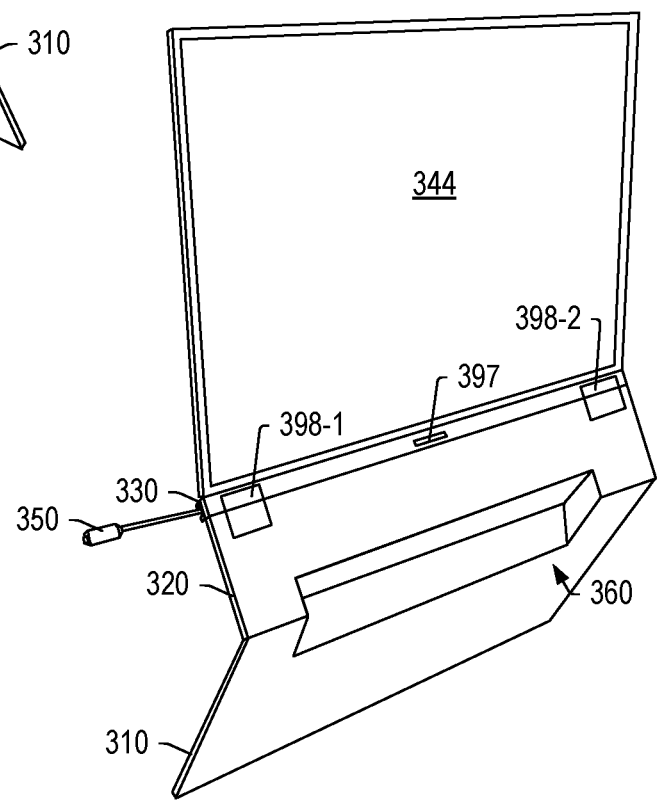
Figure 14:
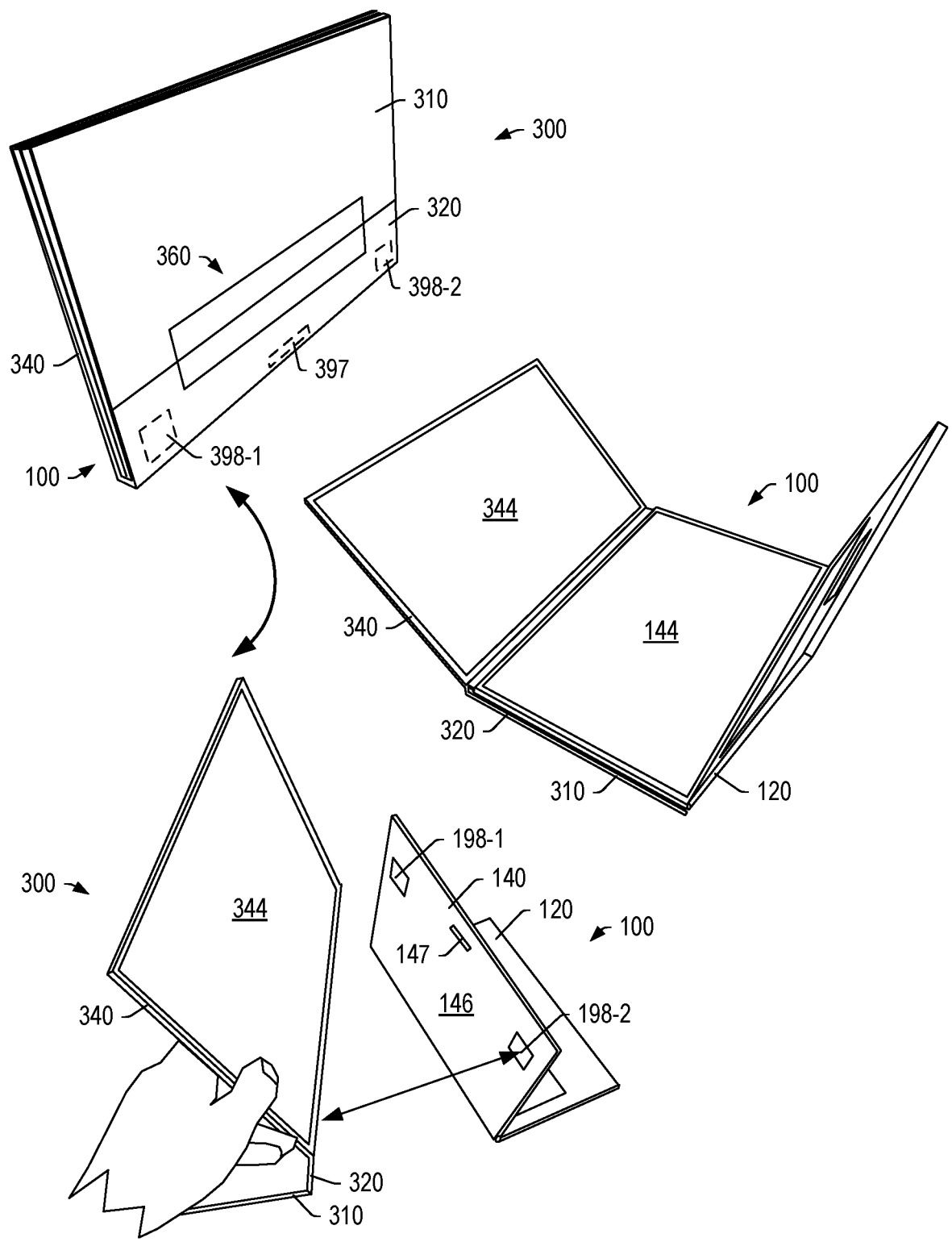
FIG. 14 is a series of perspective views of an example of a display device and another device that illustrate examples of methods.
Figure 15:
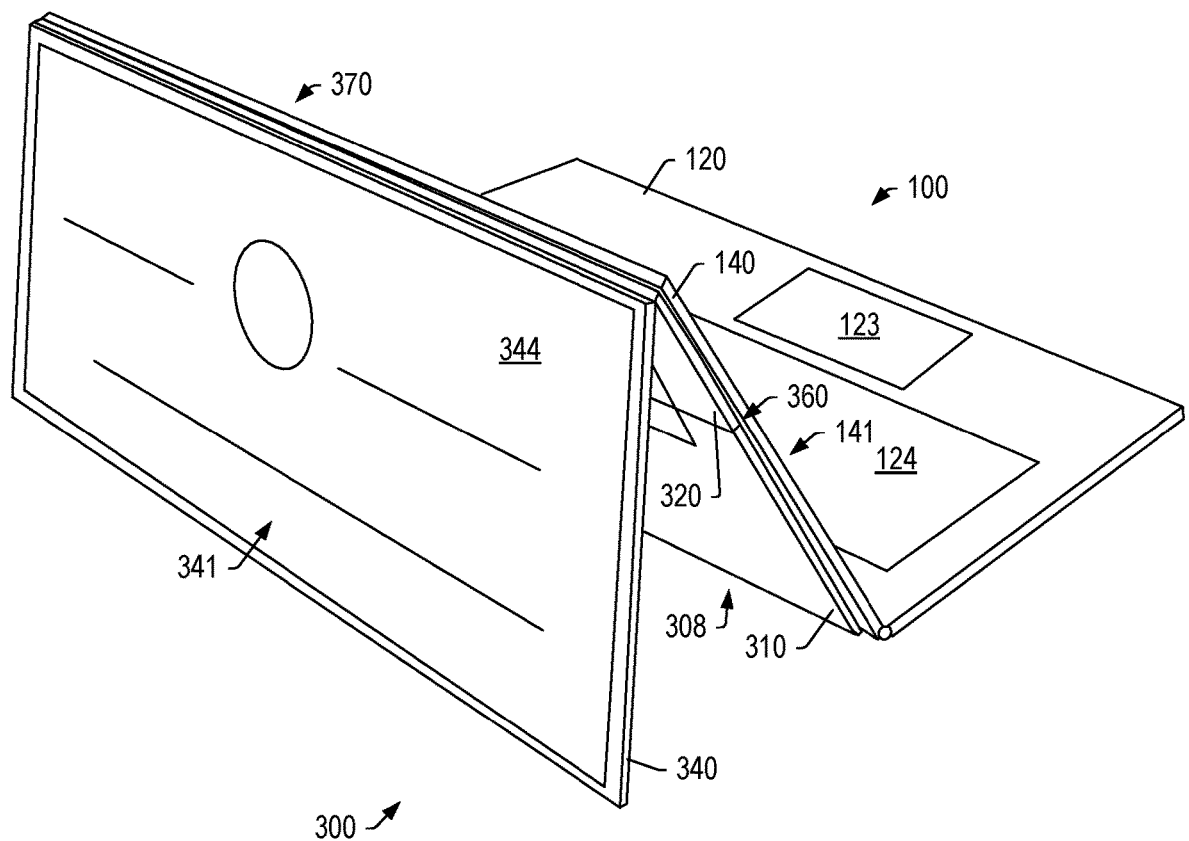
FIG. 15 is a perspective view of an example of a display device and an example of another device.

FIG. 11, FIG. 12, FIG. 13, FIG. 14, FIG. 15 and FIG. 16 show various examples of the display device 300. In FIG. 11, FIG. 12 and FIG. 15, the display device 300 can be arranged with respect to a computing device such as, for example, the device 100, where the keyboard housing 120 is exposed and available for use while the display surface 344 of the display 341 of the display panel 340 is exposed and visible above (FIG. 11 and FIG. 12) or on an opposing side (FIG. 15) of the display 141 of the display housing 140. In such examples, an accessory keyboard may be optionally utilized or the keyboard 124 of the keyboard housing 120 may be utilized. As shown, where desktop, tabletop, countertop, etc., space is not available for an accessory keyboard, the keyboard 124 of the keyboard housing 120 can be utilized along with the display 141 and the display 341 of the display housing 340.

As explained, elevating a display of a computing device using a stand (see, e.g., FIG. 2B) can help with ergonomics and user experience, for example, to reduce user fatigue. The display device 300 can provide an elevated display, which may be utilized for rendering of information for one or more applications. For example, a user may view the display 141 of the display housing 140 for a word processing application and view the display 341 of the display panel 340 for an email application where the display 141 is elevated above the display 341 (see, e.g., FIG. 5 and FIG. 6), or, for example, a user may view the display 341 of the display panel 340 for a word processing application and view the display 141 of the display housing 140 for an email application where the display 341 is elevated above the display 141 (see, e.g., FIG. 11 and FIG. 12).

As shown in FIG. 3, the second portion 320 can be a front support portion of the support panel 308 that forms a stand along with the first portion 310, which can be a back support portion of the support panel 308. As an example, the tubular member 330 can be a cable garage (e.g., a connector bay where the connector includes a cable). For example, such a garage can store at least a portion of a cable that's used to connect the display 341 to a computing device. In such an example, the display connector 350 can be pulled out and plugged into the computing device (e.g., consider a HDMI connector, a DisplayPort (DP) connector, a USB-C connector, a Thunderbolt connector, a combination connector (e.g., Thunderbolt 3 and USB-C, etc.), etc.). As explained, a computing device can sit securely (e.g., with stability) against at least a portion of the display device 300.

As an example, the display device 300 can be utilized as a cover for a computing device. For example, when utilized with a notebook, the notebook can fit between the support panel 308 and the display panel 340 where the display device 300 acts as a protective cover for travel. Such an arrangement can also ease access (e.g., using a single hand, etc.) when placing into or pulling out of bag or backpack.

As an example, a display device can include a pocket or other coupling feature(s) for an external keyboard. For example, consider one or more magnets that can provide magnetic attraction force to removably secure an accessory keyboard.

As explained, the support panel 308 can include the hinge 360, which allows for adjustment of the first portion 310 with respect to the second portion 320. As mentioned, such a hinge can be a friction hinge that provides support when holding and raising a computing device (e.g., notebook, etc.) off a surface.

As an example, the tubular member 330 can include one or more removable features. For example, consider a removable mouse that may be a foldable mouse (e.g., an origami mouse, etc.). In such an example, the mouse may be removably seated at an end that is an opposing end of the display connector 350. As an example, the tubular member can include one or more human input devices (HIDs). For example, consider a touch-sensitive surface such as a touchpad and/or one or more rollers (e.g., roller wheels, track balls, etc.). In such examples, a user may touch and control a cursor, etc., using such one or more features of the tubular member 330 (e.g., consider thumb, index finger and/or middle finger control, navigation, etc.).

As an example, the display device 300 can include one or more rechargeable batteries, which may be part of one or more removable components. For example, consider a removable HID that includes a rechargeable battery. In such an example, where the display connector 350 provides for receipt of power, such power may be routed to one or more rechargeable batteries (e.g., via one or more interfaces), in a wired and/or wireless manner. As an example, consider a mouse that includes a rechargeable battery that can be charged using one or more interfaces of the display device 300. In such an example, the mouse may plug into the tubular member 300 via an interface, which may be a wired interface (e.g., USB, etc.) for charging.

As an example, a HID may be a dual purpose device. For example, consider a mouse that includes memory such as 1 GB of memory or more that can be utilized for storage of information. In such an example, a user may remove the HID and utilize it as a mouse and/or a thumb drive. As an example, the tubular member 330 of the display device 300 may be outfitted with one or more features such that it provides a variety of features (e.g., single purpose features, multiple purpose features, etc.).

As explained, the display device 300 can be an ergonomic stand, provide an auxiliary display, be a protective cover, save space (e.g., in a backpack or bag), and include one or more accessories (e.g., an external keyboard, integrated storage pocket, an integrated mouse/thumb-drive, etc.).

As explained, the display 341 of the display device 300 may be oriented to be an elevated display (see, e.g., FIG. 4 and FIG. 5) or a lower display (see, e.g., FIG. 11 and FIG. 12). In such examples, a user may decide what to have rendered on the display 341 and, for example, a display of a computing device such as, for example, the display 141 of the device 100. In such examples, a user may decide on utilizing an upper or elevated display for viewing information associated with primary tasks such that ergonomics are improved when compared to use of a notebook without a stand (see, e.g., the scenario 201 of FIG. 2A versus the scenario 202 of FIG. 2B).

The display device 300 includes display circuitry where the display 341 can be an LED type of display or another type of display. As an example, the display 341 can be a touch-screen display, which may be a digitizer display, for example, operable using a stylus (e.g., consider a passive and/or an active stylus).

As explained, the display connector 350 can be a USB-C type of connector or another type of connector suitable for transmission of at least video data. As an example, one or more circuit boards can be included that are directly and/or indirectly electrically coupled to the display connector 350 and the display 341. As an example, a hub or controller circuit board can be included along with a display circuitry board (e.g., a display driver board, etc.).

As an example, a display connector may be provided as a contact connector such as, for example, a pogo pin type of connector. In such an example, where a computing device includes a matching connector, the display device 300 may be utilized with a cable-based display connector. As an example, a display device can include one or more power interfaces and may include one or more rechargeable batteries (e.g., consider an integrated battery such as a 12 VDC battery, etc.). As an example, where provided with a power connector that may also be a display connector, a display device may operate using power from one or more sources.

Figure 4:
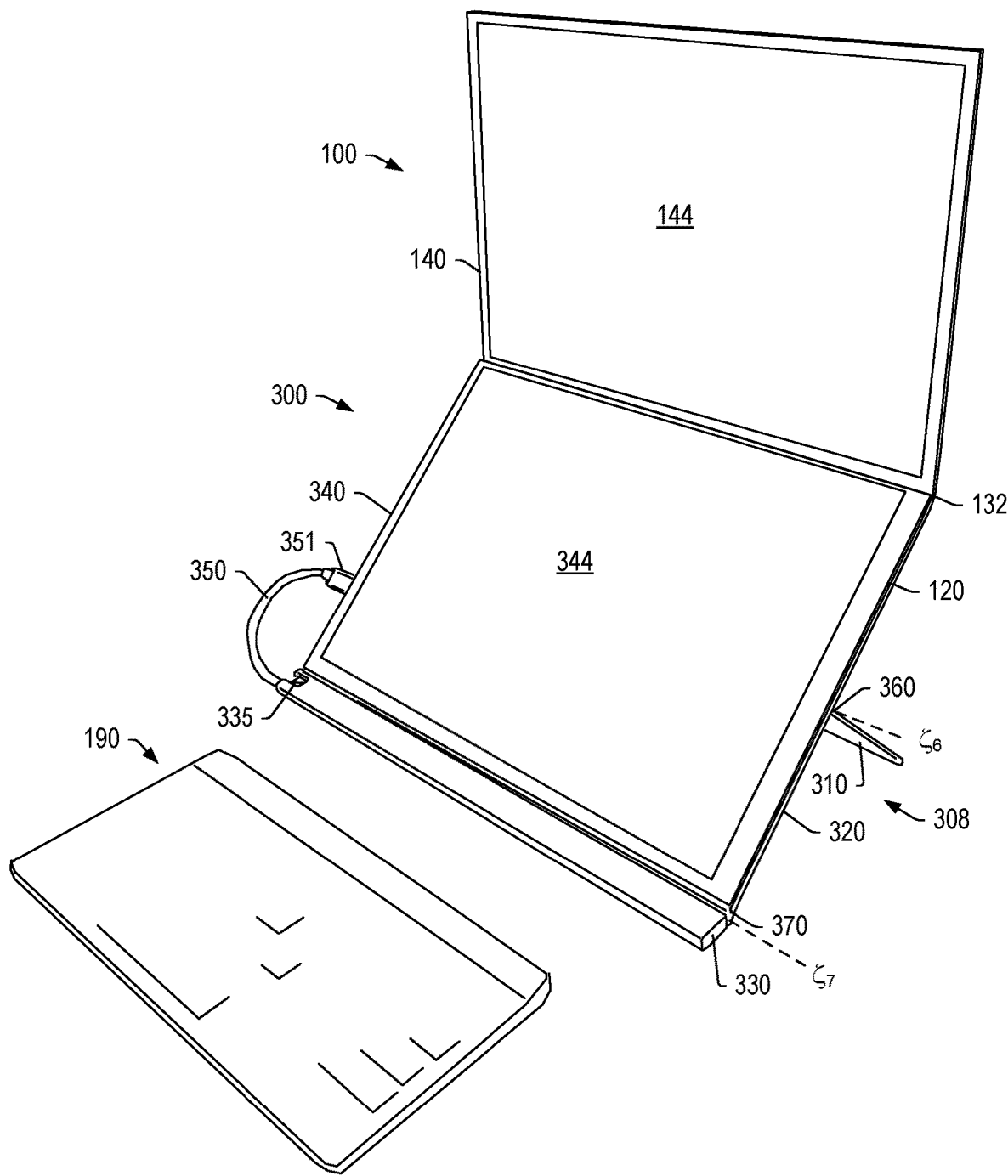
FIG. 4 is a perspective view of the display device of FIG. 3 and the device 100 of FIG. 1 along with an example of an optional accessory keyboard.

As shown in the example of FIG. 3, the display device 300 can be a stand for the display 341 and/or for a computing device (see, e.g., FIG. 4). As explained, various orientations, arrangements, etc., may be provided via such a display device. As an example, the display device can be a stand, an auxiliary display and a cover.

FIG. 4 shows a front side perspective view of the display device 300 as a stand for the device 100 where the keyboard housing 120 of the device 100 is disposed at least in part between the second portion 320 of the support panel 308 and the display housing 340. As shown, the display connector 350 is extended from the tubular member 330 via an opening 335 of the tubular member 330 such that a connector end 351 of the display connector 350 can be plugged into a port of the device 100 (e.g., USB-C, etc.). In the example of FIG. 4, an accessory keyboard 190 is shown as being positioned in front of the tubular member 330. In the example of FIG. 4, the display housing 140 is operatively coupled to the keyboard housing 120 via the hinge assembly 132, which may include one or more hinges, etc.

The arrangement of FIG. 4 may be compared to the scenario 202 of FIG. 2B where the display housing 140 is shown as being elevated and at an angle that is more ergonomic than in the scenario 201 of FIG. 2A.

Figure 5:
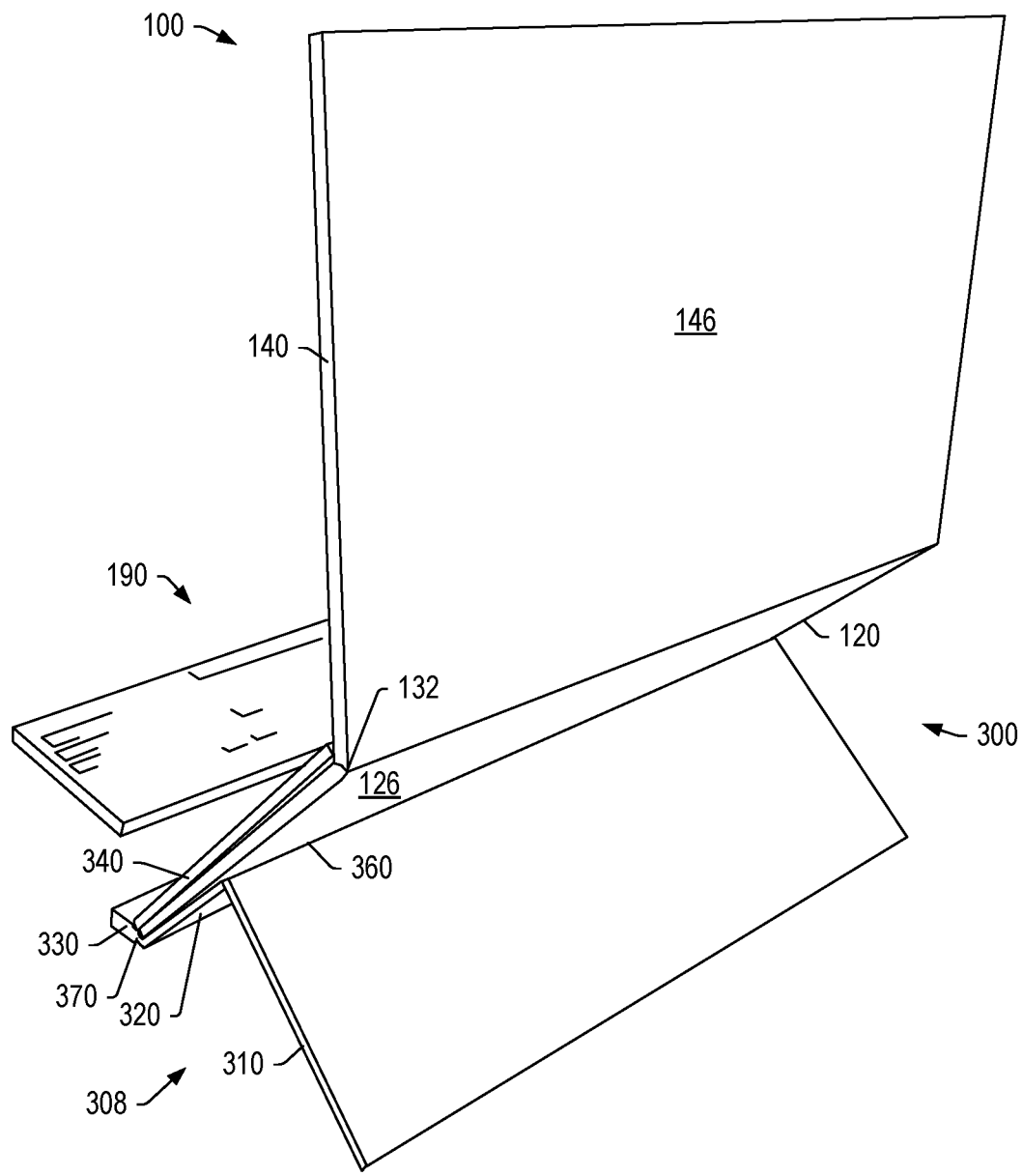
FIG. 5 is a back side perspective view of the assembly of FIG. 4.

FIG. 5 shows a back side perspective view of the arrangement of FIG. 4 where the display device 300 is a stand for the device 100. In FIG. 5, a back side 146 of the display housing 140 can be seen along with a portion of a back side 126 of the keyboard housing 120, which is exposed due to the first portion 310 of the support panel 308 being folded downward to form a tent like stand for the device 100.

Figure 6:
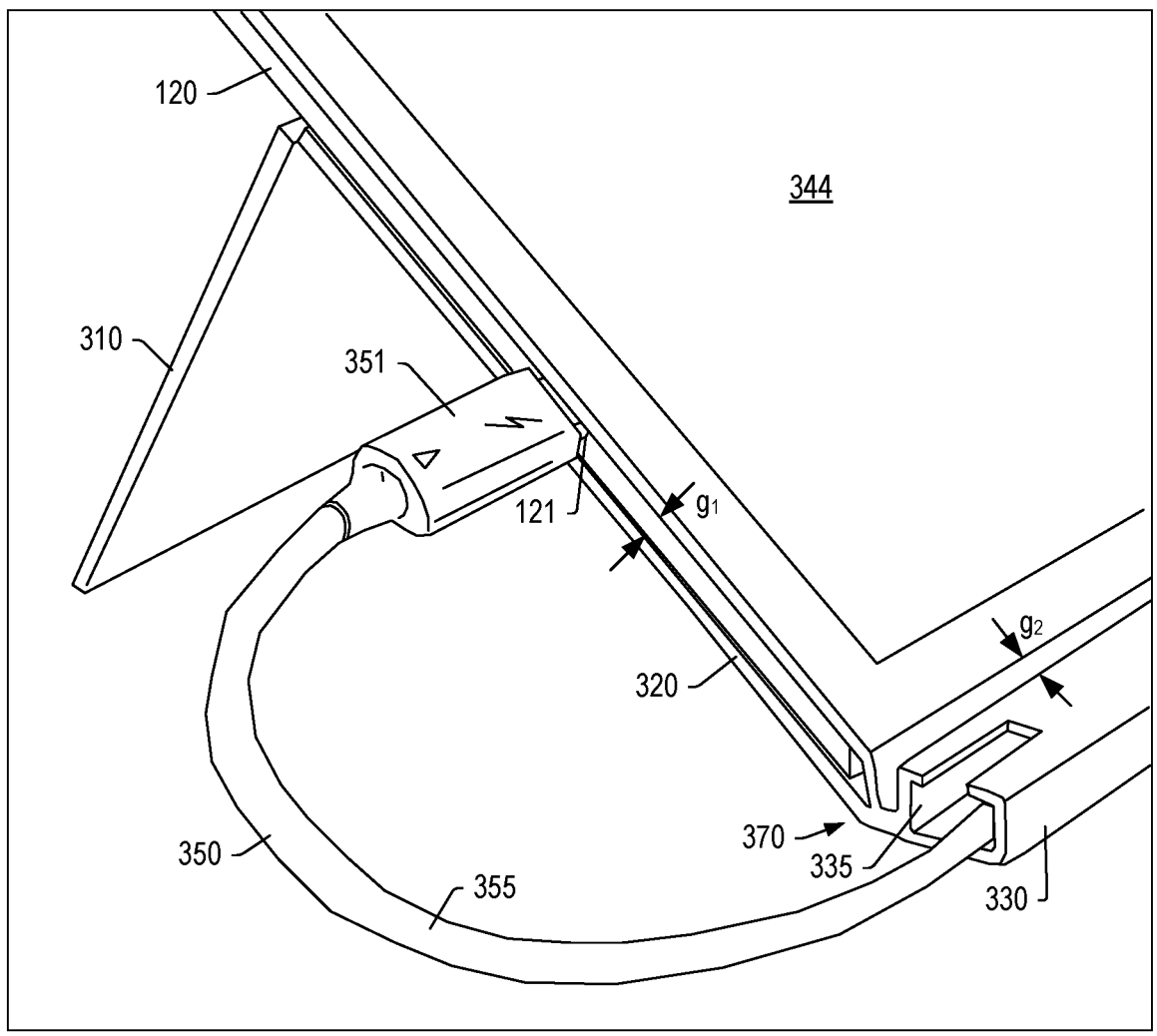
FIG. 6 is a perspective view of a portion of an example of a display device and a device as connected via an example of a cable.

FIG. 6 shows a perspective view of a portion of the display device 300 in an assembly with the device 100. As shown, the keyboard housing 120 includes a port 121 (e.g., a female connector, etc.) that can receive a portion of the connector end 351 of the display connector 350, which includes a cable 355. In the example of FIG. 6, the length of the cable 355 is in a range of approximately 10 cm to approximately 60 cm. As an example, a length of the cable 355 may be less than a length of the tubular member 330. As an example, where a reel mechanism is utilized, a length of the cable 355 may be less than, equal to or greater than a length of the tubular member 330. For example, consider a spring-biased reel that can take in and reel out a desired length of the cable 355. As an example, the opening 335 of the tubular member 330 may be sized such that an interference fit (e.g., a press fit) is formed with the connector end 351 of the display connector 350. For example, consider the tubular member 330 be formed of a resilient, elastically deformable material that can deform to receive the connector end 351 to removably secure the connector end 351. As an example, the connector end 351 may be formed at least in part from a resilient, elastically deformable material.

Figure 7A:
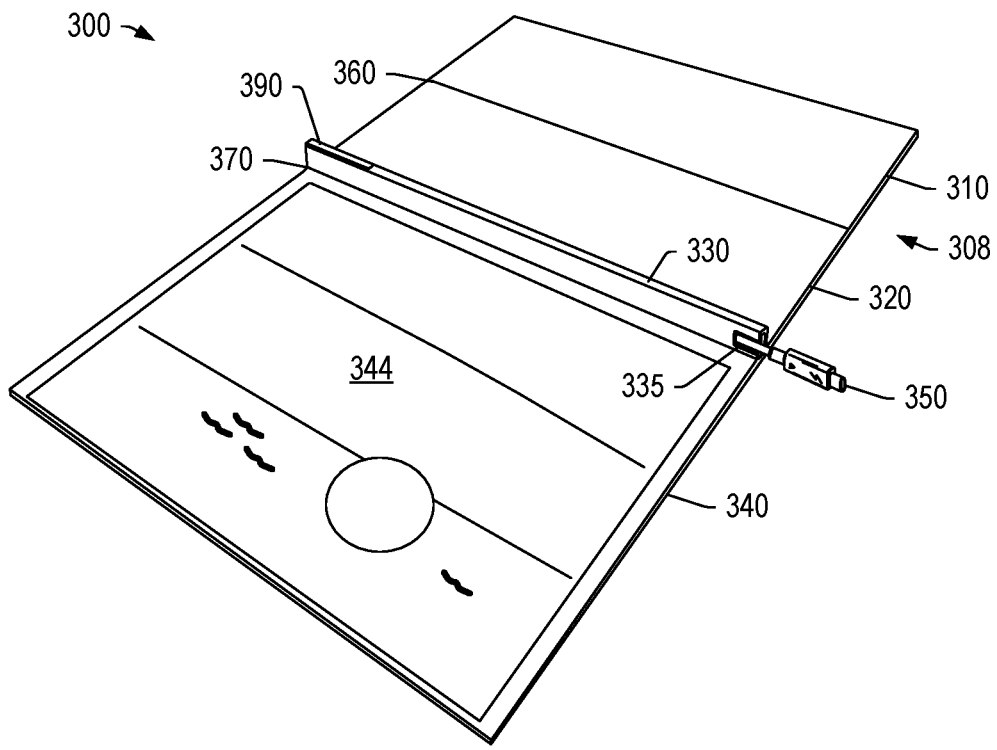
FIG. 7A and FIG. 7B are perspective views of an example of a display device and the display device as a cover for another device, respectively.
Figure 7B:
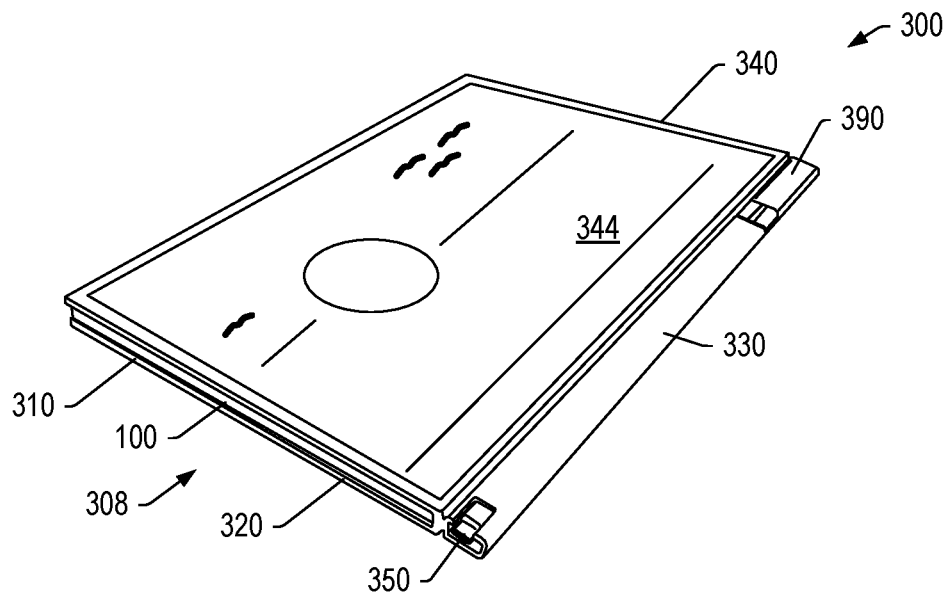

FIG. 7A and FIG. 7B show perspective views of the display device 300. In the view of FIG. 7A, the display surface 344 includes example renderings for ease in identifying the display surface 344. As shown, the display device 300 can be arranged in a flat or planar orientation as in FIG. 7A and in a folded orientation as in FIG. 7B, where the tubular member 330 is exposed, which is shown as optionally including a removable component 390 (e.g., a micromouse, a thumb drive, etc.).

Figure 8A:
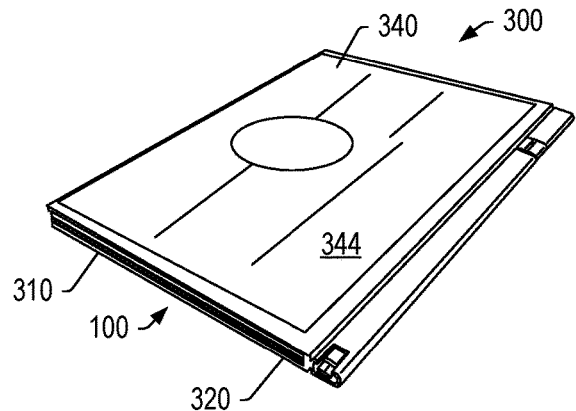
FIG. 8A, FIG. 8B and FIG. 8C are perspective views of an example of a display device and another device.
Figure 8B:
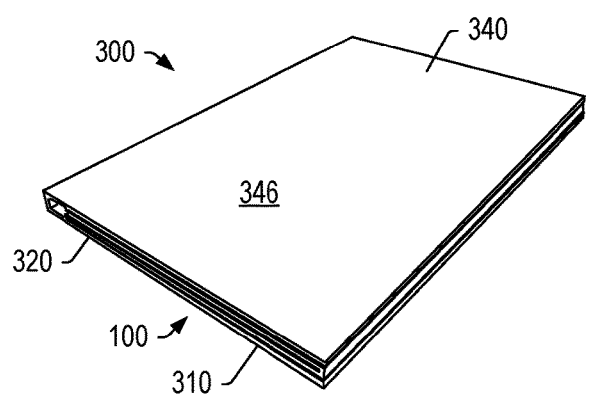
Figure 8C:
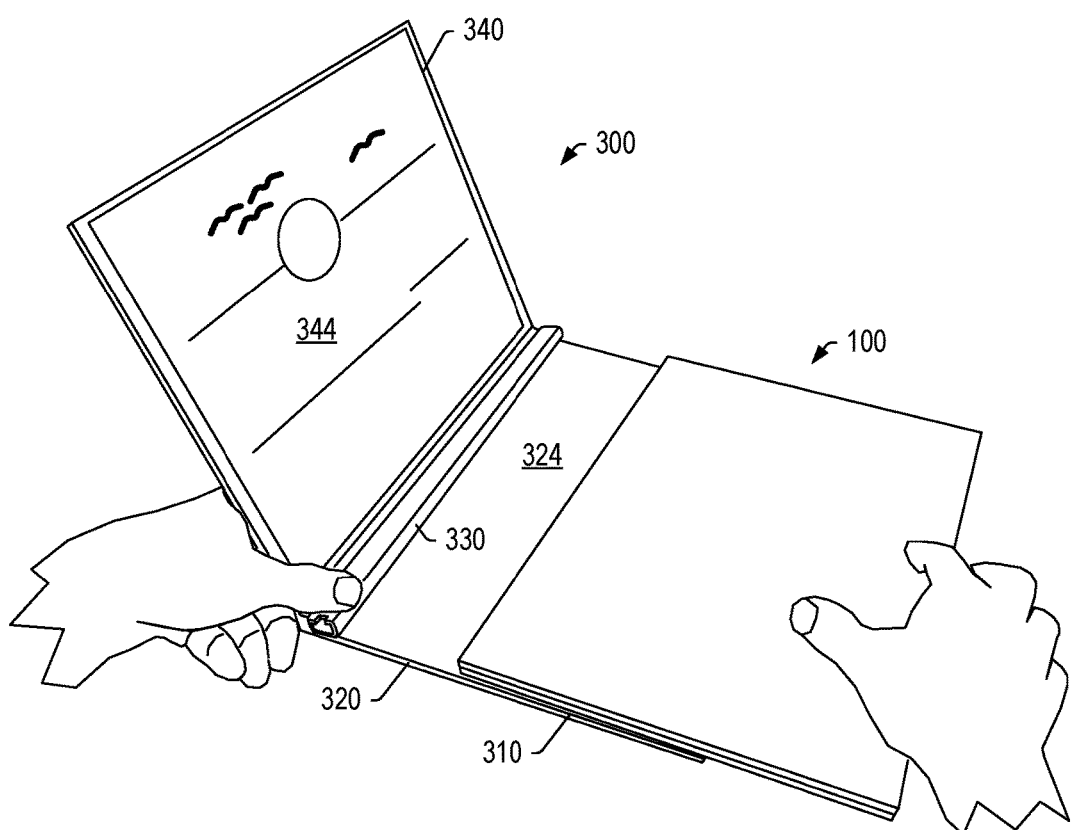

FIG. 8A, FIG. 8B and FIG. 8C show perspective views of the display device 300 along with the device 100. As shown in FIG. 8A, the display device 300 can cover the device 100 where the display surface 344 is exposed and where the tubular member 330 is exposed. As shown in FIG. 8B, the display device 300 can cover the device 100 where the display surface 344 is not exposed but where the back side surface 346 of the display panel 340 is exposed. In the example of FIG. 8B, the tubular member 330 is disposed between the support panel 308 and the display panel 340, for example, with ends visible from the sides. In such an example, the tubular member 330 may act as a spacer and/or a stop surface (e.g., a bumper, etc.) for the device 100.

As shown in FIG. 8C, a user may insert or remove the device 100, for example, to cover the device 100 by the display device 300 as in FIG. 8B or for one or for use of the device 100, optionally with the display device 300 as an auxiliary display and/or a stand. In the example of FIG. 8C, a surface 324 of the second portion 320 of the support panel 308 is visible. A user may slide the device 100 along the surface 324 until the device 100 contacts the tubular member 330, which may be a support bumper. In such an example, when the device 100 is covered by the display device 300 as in FIG. 8B, the tubular member 330 may provide mechanical shock protection (e.g., during carry, transport, contact with an object, etc.).

Figure 9:
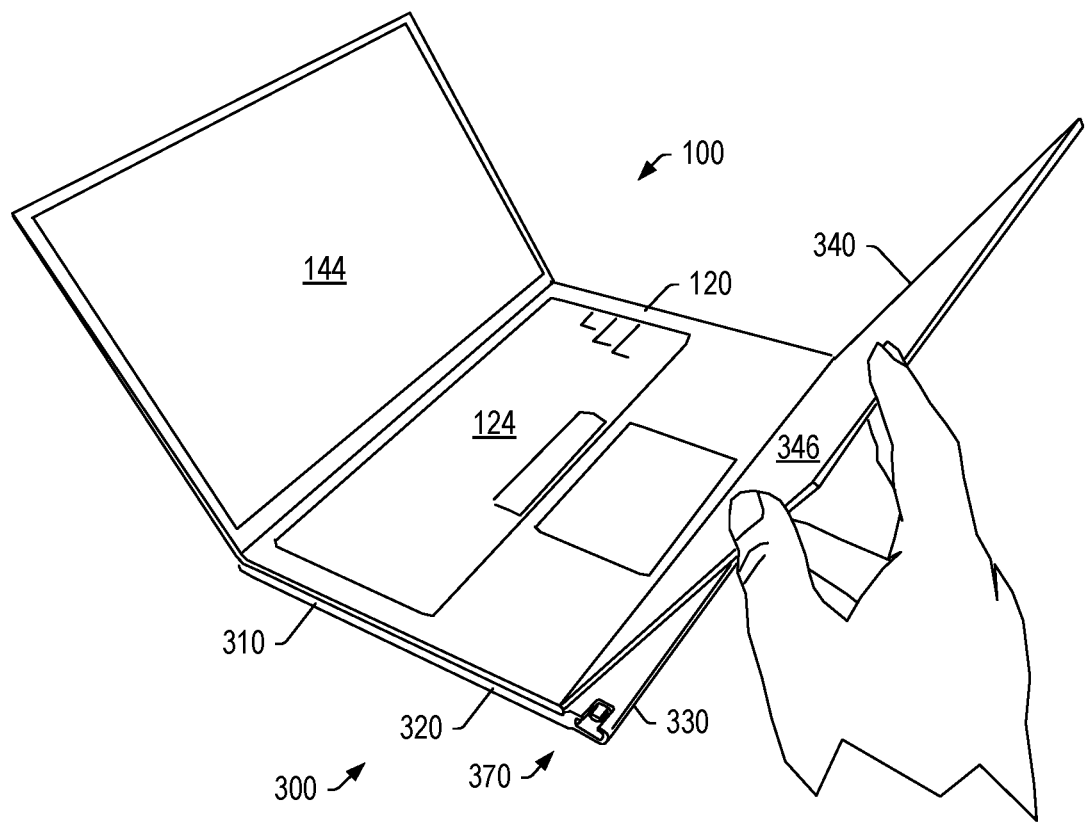
FIG. 9 is a perspective view of an example of a display device and another device.

FIG. 9 shows a perspective view of the display device 300 and the device 100 where the back side surface 346 of the display panel 340 is visible, which may be positioned to be in contact with the keyboard 124 of the keyboard housing 120 of the device 100.

Figure 10:
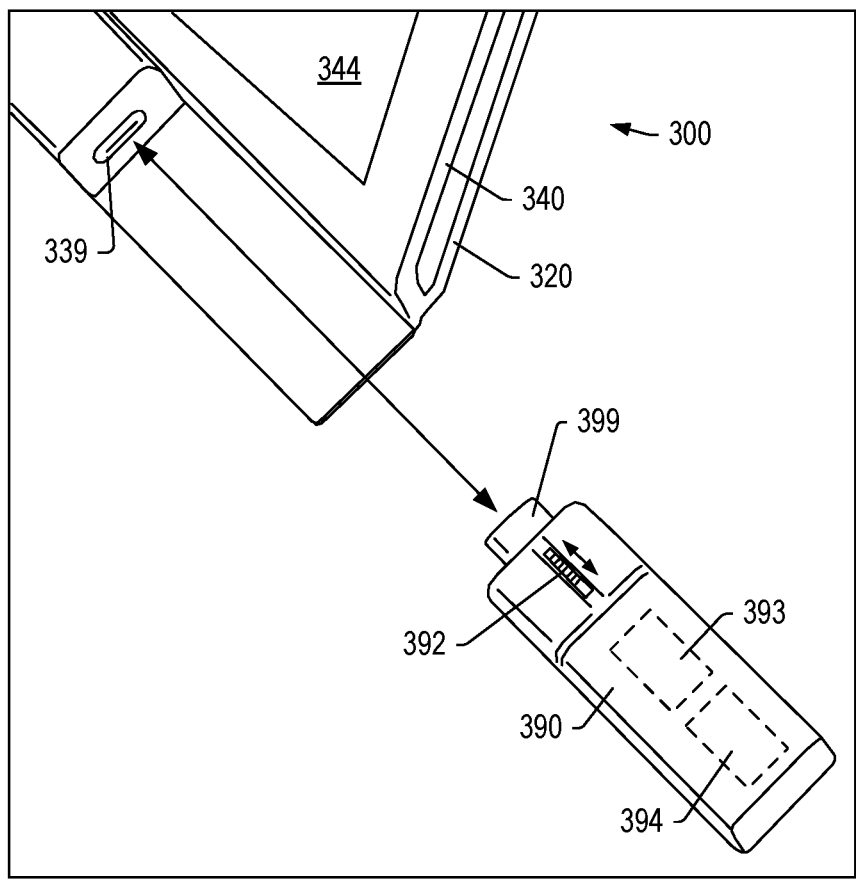
FIG. 10 is a perspective view of a portion of an example of a display device that includes an example of a removable component.

FIG. 10 shows a perspective view of a portion of the display device 300 as including the removable component 390, which may be a combination HID and memory device (e.g., thumb drive, etc.), as indicated by memory circuitry 393 (e.g., a memory chip with a memory controller, etc.). As an example, the removable component 390 can include an input mechanism 392 such as, for example, a wheel, a touch surface, a ball, a slider, etc. The removable component 390 may include a rechargeable battery 394 that can receive power via a plug 399 being received by a port 339 of the tubular member 330. In the example of FIG. 10, the removable component 390 may be translatably removable and insertable for coupling with the tubular member 330. As an example, a removable component may include a rechargeable battery that can be utilized to power another device. For example, consider utilization of the removable component 390 to provide power to a cell phone by plugging the plug 399 into a port of the cell phone to transmit power to the cell phone (e.g., consider a USB connection, a Thunderbolt connection, etc.). As an example, the removable component 390 may be a casting component that may receive video data and/or transmit video data. For example, the removable component 390 may be operable as a casting dongle. As an example, the removable component 390 may include a port such that it can be coupled to the connector 350 where upon connection, it may allow for at least wireless receipt of video data. In such an example, the removable component 390 and/or the display device 300 may include one or more rechargeable batteries that can power a display of the display panel 340 and/or circuitry of the removable component 390.

FIG. 11A and FIG. 11B show perspective views of an example of the display device 300 with the device 100 (FIG. 11A) and with a tablet device 1100 (FIG. 11B). As shown, the display surface 344 of the display device 300 can be elevated above the display 144 or a display 1144 where the display device 300. In such examples, the display device 300 may be oriented in a zig-zag manner, for example, defined by three planes, a plane of the first portion 310, a plane of the second portion 320 and a plane of the display panel 340. As shown, the plane of the display panel 340 may be substantially orthogonal to a plane of a support surface on which the keyboard housing 120 and the edge 312 of the first portion 310 are supported. Such an arrangement can be compared to the scenario 202 of FIG. 2B, which, in the examples of FIG. 11A and FIG. 11B, provides for ergonomic viewing of the display surface 344. In the example of FIG. 11A, for the device 100, the keyboard 124 is exposed such that it may be utilized with both displays 141 and 341. For example, a user may type using the keyboard 124 where commands, instructions, etc., can instruct one or more processors to render information to the display 141 and/or the display 341.

FIG. 12 shows a back side perspective view of the example of FIG. 11A. As shown, the hinge 360 can be a gusset type of hinge that may be made of planar material with cuts that separate a portion or portions of the planar material from the first portion 310 and the second portion 320 of the support panel 308. As shown, the hinge 360 can extend outwardly such that resistance exists to further movement of the portions 310 and 320 with respect to each other. For example, an angle $\phi_h$ is shown along with the tent angle $\phi_t$. In such an example, the hinge 360 can generate stiffness that resists further decrease in the angle $\phi_h$, which can define the angle $\phi_t$. The hinge 360 may be a type of living hinge in that the creases illustrated are formed via thinning of a material. For example, the support panel 308 can be made of a polymeric or other material where a juncture is thinned to define the first portion 310 and the second portion 320 and where cuts are made such that a portion of the material juts outwardly as in forming the angle $\phi_h$. In such an example, mechanical resistance can exist within the jutted out portion (e.g., two panel portions) such that the angle $\phi_h$ is stabilized for support of the display panel 340 with contact between the second portion 320 and the back side surface 146 of the display housing 140 of the device 100.

FIG. 13A and FIG. 13B show perspective views of examples of the display device 300. As shown, the display device 300 can include a contact interface 397 and one or more magnets 398-1 and 398-2. As shown in FIG. 13B, the display device 300 can include the tubular member 330 and the display connector 350. As an example, the display device 300 may attach to a computing device via the one or more magnets 398-1 and 398-2 such that a contact promoting force is applied to the contact interface 397, which may be, for example, a spring-biased contact interface (e.g., pogo pins, etc.). In such an example, transfer of at least video may occur via the contact interface 397 where the computing device includes an appropriate mating, matching interface, along with ferromagnetic material (e.g., optionally one or more magnets) that can be attracted to the one or more magnets 398-1 and 398-2.

FIG. 14 shows various perspective views that illustrate example methods of arranging an example of the display device 300 with respect to the device 100. As shown, the display device 300 can be a cover for the device 100 that can be opened to expose the device 100 where the device 100 and the display device 300 can be positioned such that the magnets 398-1 and 398-2 of the display device 300 can attract to material 198-1 and 198-2 of the device 100 where such attraction can cause contact between the contact interface 197 and a contact interface 147 of the display housing 140 of the device 100.

FIG. 15 shows a perspective view of an example of the display device 300 along with the device 100. As shown, the display panel 340 can be rotated about the hinge 370 to form a tent with the support panel 308. In such an example, the first portion 310 and the second portion 320 of the support panel 308 are in a common plane, which is substantially parallel to a plane of the display housing 140 of the device 100. In such an example, one person may view the display 341 and another person may view the display 341 while being able to utilize features of the keyboard housing 120 (e.g., the keyboard 124, the touchpad 123, etc.). As an example, one or both of the displays 141 and 341 may be touch-screen displays. As an example, the display panel 340 can include one or more sensors that can detect orientation of the display panel 340, for example, with respect to gravity. In such an example, circuitry of the display device 300 and/or the device 100 can be instructed to properly render information to the display 341. For example, when the display 341 is facing the same side as the display 141, rendering to both displays may be in a common orientation; whereas, when the display 341 is flipped over as shown in FIG. 15, circuitry may be instructed to render information in a different orientation (e.g., where bottom is now the top and the top is now the bottom, such as a 180 degree rotate).

Figure 16:
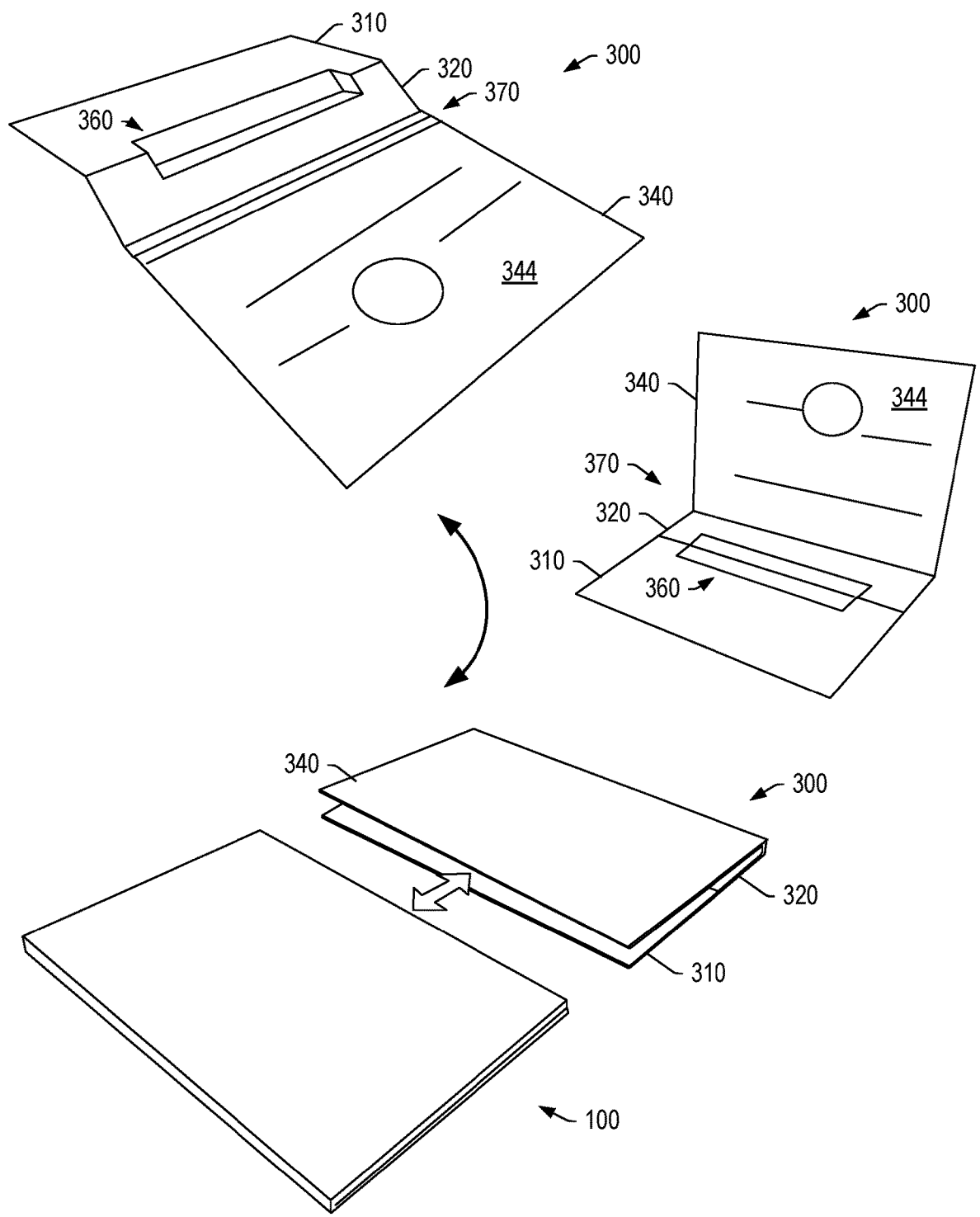
FIG. 16 is a series of perspective views of an example of a display device and another device that illustrate examples of methods.

FIG. 16 shows various perspective views of an example of the display device 300 that illustrate methods of arranging the display device 300 with respect to the device 100. As shown, the display device 300 can be utilized as a cover for the device 100.

As shown in the examples of FIG. 12, FIG. 13A, FIG. 13B, and FIG. 14, the device 100 can be attached to the second portion 320 of the support panel 308. In such an example, the support panel 308 can include a gusset type of feature and, for example, one or more magnets. In the example of FIG. 11 and FIG. 12, the keyboard 124 of the device 100 and its touchpad 123 are exposed as they are not covered by the display device 300 nor angled in a manner that would prevent use thereof. In such an example, a user may operate the display device 300 as coupled to the device 100 without using an accessory keyboard (e.g., or accessor mouse, etc.).

As explained, a display device may or may not include a display connector (e.g., a video connector, etc.) that is on a cable. For example, a contact connector may be utilized where a computing device includes a matching contact connector. As an example, a display device may include a contact connector, a cable-based connector or a contact connector and cable-based connector.

As explained, the hinge 360 may be a living type of hinge. For example, consider a die-cut like fold creating an integrated living hinge for gusset support.

As explained, a display device can provide for a tent mode or tent orientation with a notebook computer, which may be suitable for collaboration between individuals. For example, consider one user presenting with the notebook's display pointed at her and someone on the opposite side viewing the presentation from the display device's display.

As explained, a display device can be an ergonomic stand, an auxiliary display, a travel protection cover as a space saving device for easy access from a backpack or bag, and, for example, configurable in a tent mode for collaboration where a notebook's keyboard and touchpad are accessible.

As an example, a display device can include a display panel hinged to a support panel that includes a first portion hinged to a second portion, where the display panel includes a display surface and a back surface, where the support panel is foldable over the display surface and foldable over the back surface, and where the first portion is hingedly adjustable with respect to the second portion for angled support of the display panel. In such an example, the display device can include a display connector operatively coupled to display circuitry of the display panel. For example, consider a display connector that includes a cable where, for example, the display device can include a display connector bay for storage of the display connector. In such an example, the display connector may be stored when not used and deployable for use, with return to the display connector bay when use is finished.

As an example, a display device can include a tubular member coupled to a hinge end of a support panel. In such an example, the tubular member can include at least one storage bay. For example, consider at least one storage bay that is a memory device bay. As an example, for a support panel folded over a display surface of a display panel of a display device, a tubular member of the display device can space the support panel from the display surface to form a computing device recess between the support panel and the display panel (e.g., consider a tablet computing device recess or a laptop computing device recess that can receive a laptop computing device in a closed clamshell orientation) where, for example, the tubular member can include a computing device stop surface that can contact a computing device. In such an example, the display device may be arranged in another configuration such that the display panel folds over at least a portion of the support panel with the tubular member exposed where a gap exists between surfaces of the display panel and the support panel where the gap can be a housing recess gap for receipt of at least a portion of a housing of a computing device such as, for example, a keyboard housing of a laptop computing device such that a display housing of the laptop computing device is exposed and positioned above the display panel of the display device. As explained, where, the support panel is folded over the back surface of the display panel, the tubular member can be exposed. In such an example, where the tubular member includes one or more bays, the one or more bays may be more readily accessible.

As an example, a display device can include a first portion and a second portion of a support panel where the second portion includes at least one magnet. In such an example, contact force for mating of an electrical contact interface with an electrical contact interface of a computing device can be generated at least in part by magnetic attraction forces of the at least one magnet. In such an example, the electrical contact interface can include at least one spring. For example, consider one or more springs of one or more pogo pins.

As an example, an assembly can include a computing device that includes a housing and a display; and a computing device stand that includes a display panel that includes an auxiliary display. In such an example, the computing device stand can include a display connector operatively coupled to the auxiliary display. For example, consider a display connector that includes a cable or a cableless electrical contact connector (see, e.g., FIG. 13B where a cable connector and a cableless electrical contact connector (the contact interface 397) are shown). In such examples, the auxiliary display may be connected via electrical contact via one or more mechanisms to receive at least video data from the computing device. As explained, a display device, which may be a computing device stand with a display, may include wired and/or wireless circuitry to receive at least video data. As an example, a wired interface can include a cableless electrical contact connector such as, for example, a pogo pin connector, etc.; whereas, a wireless interface can be operable to receive and/or transmit data without physical contact between two devices. As an example, a computing device stand can include a display panel and a support panel, where the display panel is hinged to the support panel, and where the support panel includes a first portion hinged to a second portion. In such an example, a computing device suitable for use with the computing device stand may be a tablet computing device (see, e.g., FIG. 11B) or may be a laptop computing device (see, e.g., FIG. 4, FIG. 5, FIG. 6, FIG. 11A, FIG. 12, and FIG. 15).

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 17:
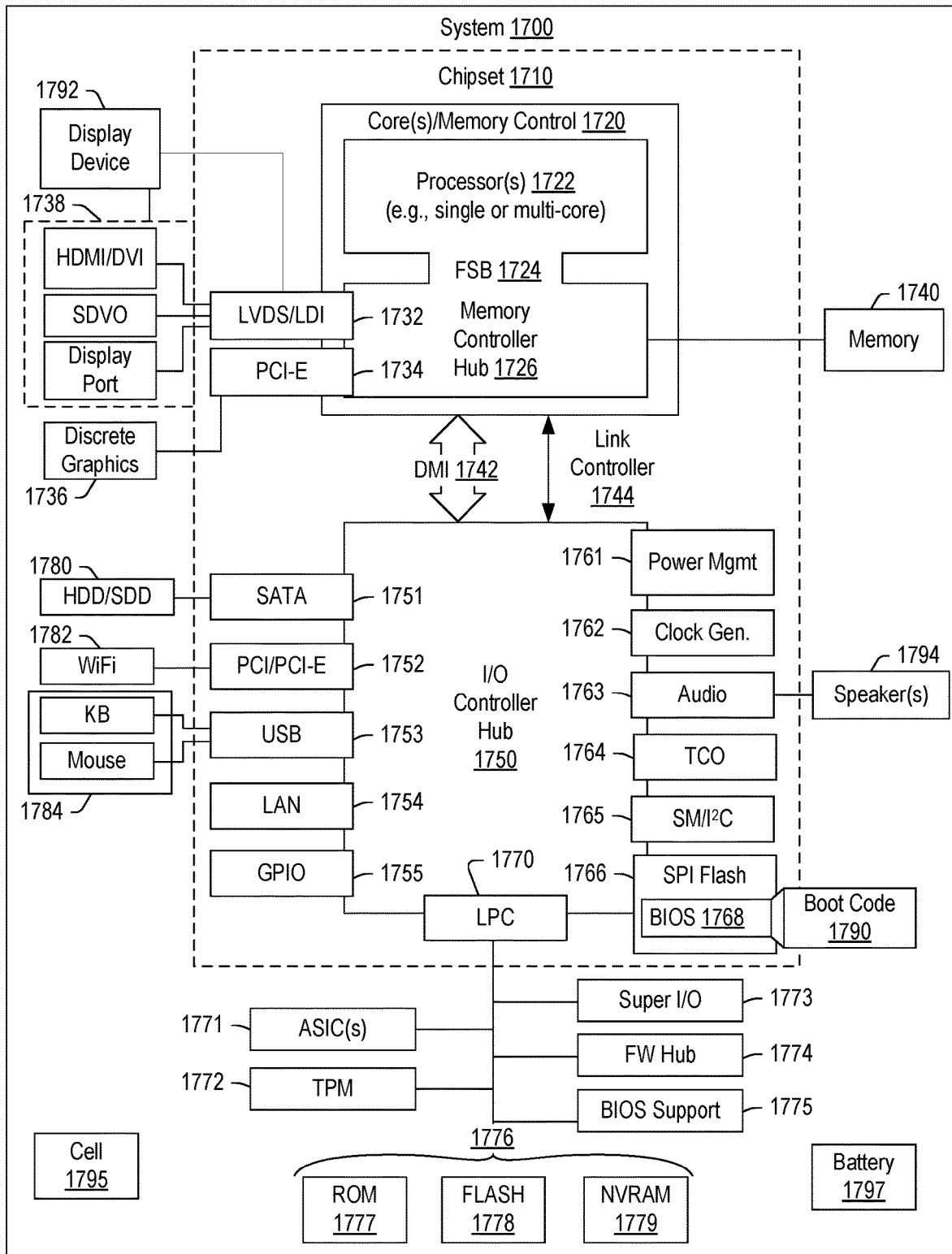
FIG. 17 is a diagram of an example of a system that includes one or more processors.

While various examples of circuits or circuitry have been discussed, FIG. 17 depicts a block diagram of an illustrative computer system 1700. The system 1700 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1700. As an example, one or more of the device 100, the display device 300, the device 1100, etc., may include at least some of the features of the system 1700.

As shown in FIG. 17, the system 1700 includes a so-called chipset 1710. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 17, the chipset 1710 has a particular architecture, which may vary to some extent depending on brand or manufacturer. The architecture of the chipset 1710 includes a core and memory control group 1720 and an I/O controller hub 1750 that exchange information (e.g., data, signals, commands, etc.) via, for example, a direct management interface or direct media interface (DMI) 1742 or a link controller 1744. In the example of FIG. 17, the DMI 1742 is a chip-to-chip interface (sometimes referred to as being a link between a "northbridge" and a "southbridge").

The core and memory control group 1720 include one or more processors 1722 (e.g., single core or multi-core) and a memory controller hub 1726 that exchange information via a front side bus (FSB) 1724. As described herein, various components of the core and memory control group 1720 may be integrated onto a single processor die, for example, to make a chip that supplants the conventional "northbridge" style architecture.

The memory controller hub 1726 interfaces with memory 1740. For example, the memory controller hub 1726 may provide support for DDR SDRAM memory (e.g., DDR, DDR2, DDR3, etc.). In general, the memory 1740 is a type of random-access memory (RAM). It is often referred to as "system memory".

The memory controller hub 1726 further includes a low-voltage differential signaling interface (LVDS) 1732. The LVDS 1732 may be a so-called LVDS Display Interface (LDI) for support of a display device 1792 (e.g., a CRT, a flat panel, a projector, etc.). A block 1738 includes some examples of technologies that may be supported via the LVDS interface 1732 (e.g., serial digital video, HDMI/DVI, display port). The memory controller hub 1726 also includes one or more PCI-express interfaces (PCI-E) 1734, for example, for support of discrete graphics 1736. Discrete graphics using a PCI-E interface has become an alternative approach to an accelerated graphics port (AGP). For example, the memory controller hub 1726 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1750 includes a variety of interfaces. The example of FIG. 17 includes a SATA interface 1751, one or more PCI-E interfaces 1752 (optionally one or more legacy PCI interfaces), one or more USB interfaces 1753, a LAN interface 1754 (more generally a network interface), a general purpose I/O interface (GPIO) 1755, a low-pin count (LPC) interface 1770, a power management interface 1761, a clock generator interface 1762, an audio interface 1763 (e.g., for speakers 1794), a total cost of operation (TCO) interface 1764, a system management bus interface (e.g., a multi-master serial computer bus interface) 1765, and a serial peripheral flash memory/controller interface (SPI Flash) 1766, which, in the example of FIG. 17, includes BIOS 1768 and boot code 1790. With respect to network connections, the I/O hub controller 1750 may include integrated gigabit Ethernet controller lines multiplexed with a PCI-E interface port. Other network features may operate independent of a PCI-E interface.

The interfaces of the I/O hub controller 1750 provide for communication with various devices, networks, etc. For example, the SATA interface 1751 provides for reading, writing or reading and writing information on one or more drives 1780 such as HDDs, SDDs or a combination thereof. The I/O hub controller 1750 may also include an advanced host controller interface (AHCI) to support one or more drives 1780. The PCI-E interface 1752 allows for wireless connections 1782 to devices, networks, etc. The USB interface 1753 provides for input devices 1784 such as keyboards (KB), one or more optical sensors, mice and various other devices (e.g., microphones, cameras, phones, storage, media players, etc.). On or more other types of sensors may optionally rely on the USB interface 1753 or another interface (e.g., $I^2C$, etc.). As to microphones, the system 1700 of FIG. 17 may include hardware (e.g., audio card) appropriately configured for receipt of sound (e.g., user voice, ambient sound, etc.).

In the example of FIG. 17, the LPC interface 1770 provides for use of one or more ASICs 1771, a trusted platform module (TPM) 1772, a super I/O 1773, a firmware hub 1774, BIOS support 1775 as well as various types of memory 1776 such as ROM 1777, Flash 1778, and non-volatile RAM (NVRAM) 1779. With respect to the TPM 1772, this module may be in the form of a chip that can be used to authenticate software and hardware devices. For example, a TPM may be capable of performing platform authentication and may be used to verify that a system seeking access is the expected system.

The system 1700, upon power on, may be configured to execute boot code 1790 for the BIOS 1768, as stored within the SPI Flash 1766, and thereafter processes data under the control of one or more operating systems and application software (e.g., stored in system memory 1740). An operating system may be stored in any of a variety of locations and accessed, for example, according to instructions of the BIOS 1768. Again, as described herein, a satellite, a base, a server or other machine may include fewer or more features than shown in the system 1700 of FIG. 17. Further, the system 1700 of FIG. 17 is shown as optionally include cell phone circuitry 1795, which may include GSM, CDMA, etc., types of circuitry configured for coordinated operation with one or more of the other features of the system 1700. Also shown in FIG. 17 is battery circuitry 1797, which may provide one or more battery, power, etc., associated features (e.g., optionally to instruct one or more other components of the system 1700). As an example, a SMBus may be operable via a LPC (see, e.g., the LPC interface 1770), via an I$^2$C interface (see, e.g., the SM/I$^2$C interface 1765), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A display device comprising:
a display panel hinged to a support panel that comprises a first portion hinged to a second portion, wherein the display panel comprises a display surface and a back surface, wherein the support panel is foldable over the display surface and foldable over the back surface, and wherein the first portion is hingedly adjustable with respect to the second portion for angled support of the display panel.

2. The display device of claim 1, comprising a display connector operatively coupled to display circuitry of the display panel.

3. The display device of claim 2, wherein the display connector comprises a cable.

4. The display device of claim 2, comprising a display connector bay for storage of the display connector.

5. The display device of claim 1, comprising a tubular member coupled to a hinge end of the support panel.

6. The display device of claim 5, wherein the tubular member comprises at least one storage bay.

7. The display device of claim 6, wherein the at least one storage bay comprises a memory device bay.

8. The display device of claim 5, wherein, for the support panel folded over the display surface of the display panel, the tubular member spaces the support panel from the display surface to form a computing device recess between the support panel and the display panel.

9. The display device of claim 8, wherein the computing device recess is a laptop computing device recess.

10. The display device of claim 8, wherein the computing device recess is a tablet computing device recess.

11. The display device of claim 8, wherein the tubular member comprises a computing device stop surface.

12. The display device of claim 5, wherein, for the support panel folded over the back surface of the display panel, the tubular member is exposed.

13. The display device of claim 1, wherein the second portion of the support panel comprises at least one magnet.

14. The display device of claim 1, comprising an electrical contact interface.

15. The display device of claim 14, wherein the second portion of the support panel comprises at least one magnet, wherein contact force for mating of the electrical contact interface with an electrical contact interface of a computing device is generated at least in part by magnetic attraction forces of the at least one magnet.

16. The display device of claim 14, wherein the electrical contact interface comprises at least one spring.

17. An assembly comprising:
a computing device that comprises a housing and a display; and
a computing device stand that comprises a display panel that comprises an auxiliary display, wherein the computing device stand comprises a support panel, wherein the display panel is hinged to the support panel, and wherein the support panel comprises a first portion hinged to a second portion.

18. The assembly of claim 17, wherein the computing device stand comprises a display connector operatively coupled to the auxiliary display.

19. The assembly of claim 18, wherein the display connector comprises a cable.

20. The assembly of claim 18, wherein the display connector comprises a cableless electrical contact connector.

* * * * *